United States Patent [19]

Suu et al.

[11] Patent Number: 5,227,875
[45] Date of Patent: Jul. 13, 1993

[54] SYSTEM FOR TRANSMITTING ENCODED IMAGE DATA WITH QUICK IMAGE EXPANSION AND CONTRACTION

[75] Inventors: Hiroshi Suu; Toshiaki Watanabe; Yuriko Tsukahara, all of Tokyo, Japan

[73] Assignee: Kabushiki Kaisha Toshiba, Kawasaki, Japan

[21] Appl. No.: 747,673

[22] Filed: Aug. 20, 1991

[30] Foreign Application Priority Data

Aug. 20, 1990 [JP] Japan ................................. 2-217081
Aug. 20, 1990 [JP] Japan ................................. 2-217217
Sep. 21, 1990 [JP] Japan ................................. 2-250157

[51] Int. Cl.$^5$ ............................................. H04N 7/12
[52] U.S. Cl. .................................. 358/133; 358/432; 364/725
[58] Field of Search ............... 358/133, 141, 180, 432, 358/136, 451; 364/725; 382/47

[56] References Cited

U.S. PATENT DOCUMENTS 4,851,906 7/1989 Koga et al. ......................... 358/133
4,860,097 8/1989 Hartnack et al. .................... 358/133
5,091,782 2/1992 Krause et al. ..................... 358/136 X

OTHER PUBLICATIONS

"A Study on the Multipoint Communication Unit"; H. Shimizu et al: 1991 Spring National Convention, EiC B-801, 1991.
"Study on ATM Switch Architecture for Point-to-Multipoint Connections"; T. Nisase, et al: EiC SSE 89-59, 1989.
"HDTV-Standard TV Compatible Coding Method by Adaptive Block Construction DCT"; Y. Yashima et al: 1989 Autumn National Convention, EiC D-54, 1989.

*Primary Examiner*—Victor R. Kostak
*Attorney, Agent, or Firm*—Oblon, Spivak, McClelland, Maier & Neustadt

[57] ABSTRACT

A system for transmitting encoded image data capable of transmitting the multiple view image data, without causing a significant level of an increase of a size of the system, a delay in a data transmission, and a limitation on a number of communication channels. The system includes: an image encoder for encoding orthogonal transform coefficient data obtained by applying an orthogonal transform to image data, and transmitting encoded image data in which the encoded orthogonal transform coefficient data are classified according to their degrees; an image processing for transmitting processed image data containing the encoded orthogonal transform coefficient data in the encoded image data along with a size change rate information indicating a size change rate by which a size of the image data are to be changed; and an image decoder for decoding the encoded orthogonal transform coefficient data in the processed image data into a degree corresponding to the size change rate indicated by the size change rate information in the processed image data by applying an inverse orthogonal transform of said degree to the encoded orthogonal transform coefficient data.

31 Claims, 27 Drawing Sheets

FIG.1 (A) PRIOR ART
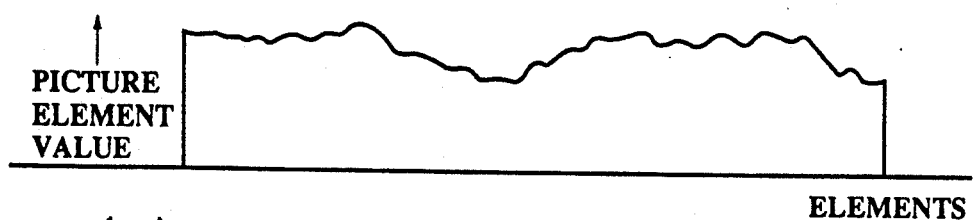
FIG.1 (B) PRIOR ART
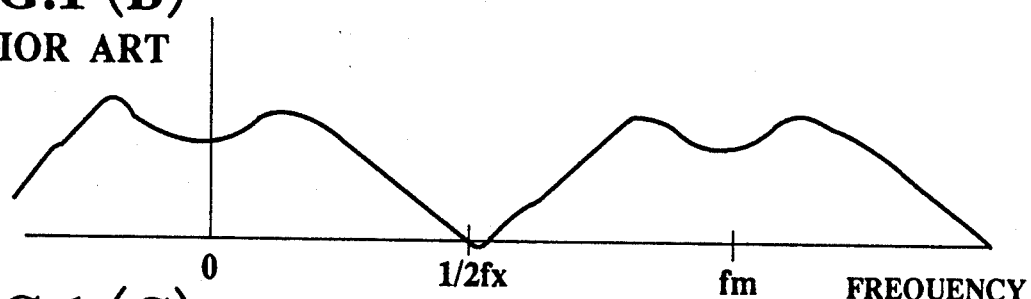
FIG.1 (C) PRIOR ART
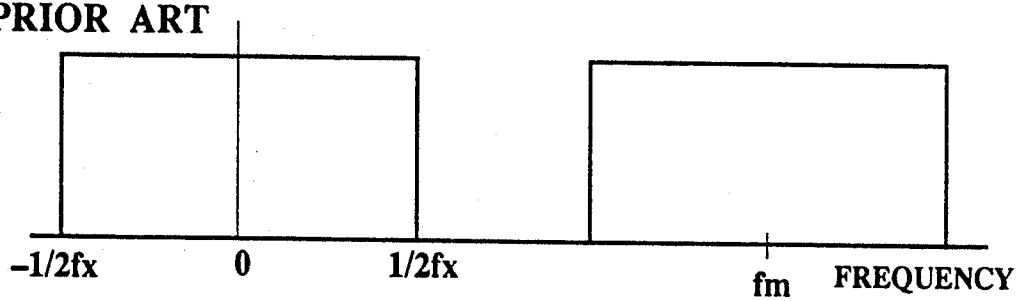
FIG.1 (D) PRIOR ART
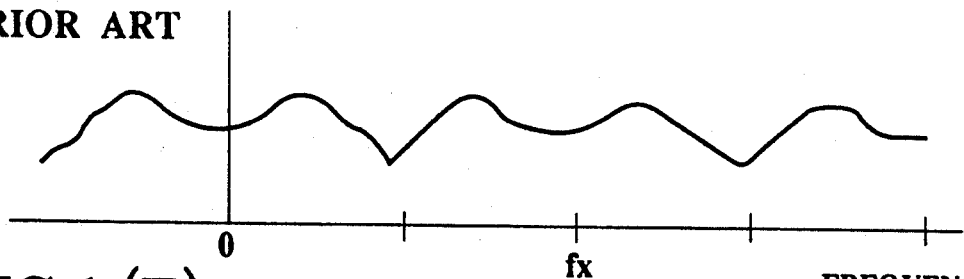
FIG.1 (E) PRIOR ART
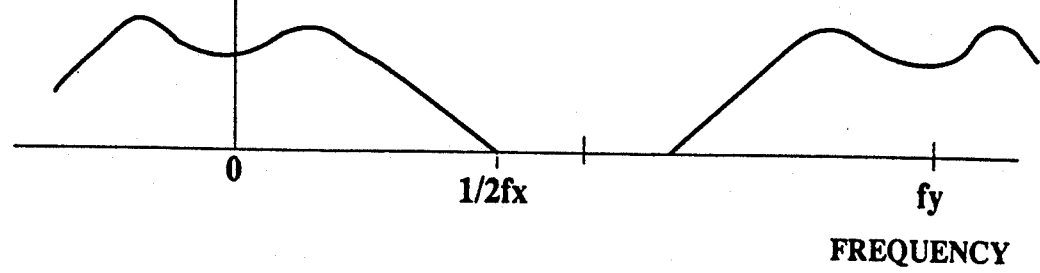

| INFORMATION SOURCE | ATTRIBUTE | QUANTIZATION CHARACTERISTIC | LETTER INFORMATION SUPPLEMENTARY INFORMATION DCT COEFFICIENT DATA |
|---|---|---|---|

| INFORMATION SOURCE | ATTRIBUTE | VIRTUAL DISPLAY DEFINITION | ACTUAL DISPLAY DEFINITION | NUMBER OF INFORMATION SOURCE | INFORMATION SOURCE IDENTIFICATION | CONTRACTION RATE | IMAGE POSITION | PLANE | |

| INFORMATION SOURCE | ATTRIBUTE | NUMBER OF LETTER REGIONS | LETTER REGION IDENTIFICATION | DISPLAY POSITION | DISPLAY FORMAT | |

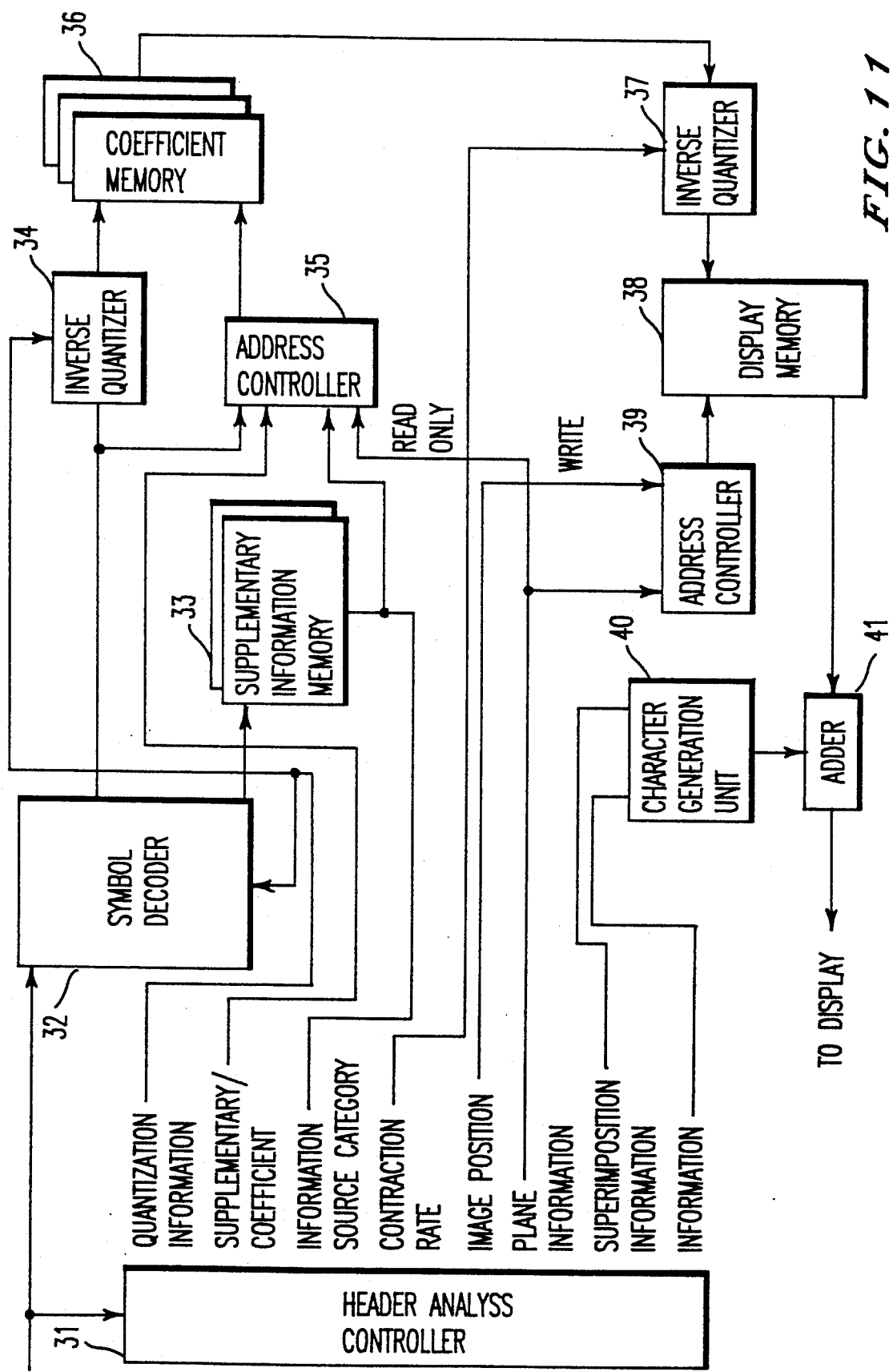

$$X_n = x(n - \tfrac{1}{2})$$

$$X'_m = x'(\tfrac{N}{M}(m - \tfrac{1}{2}))$$

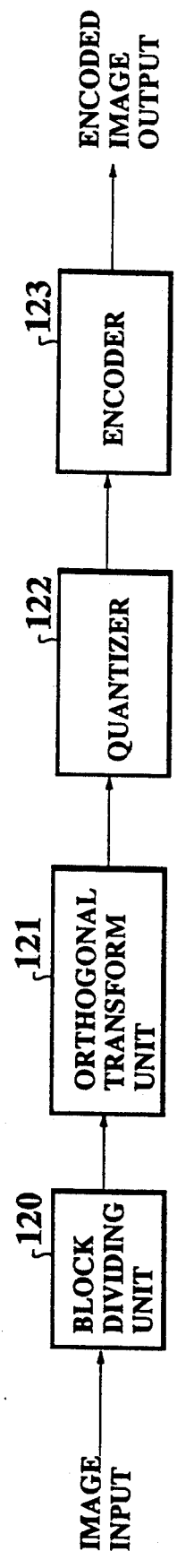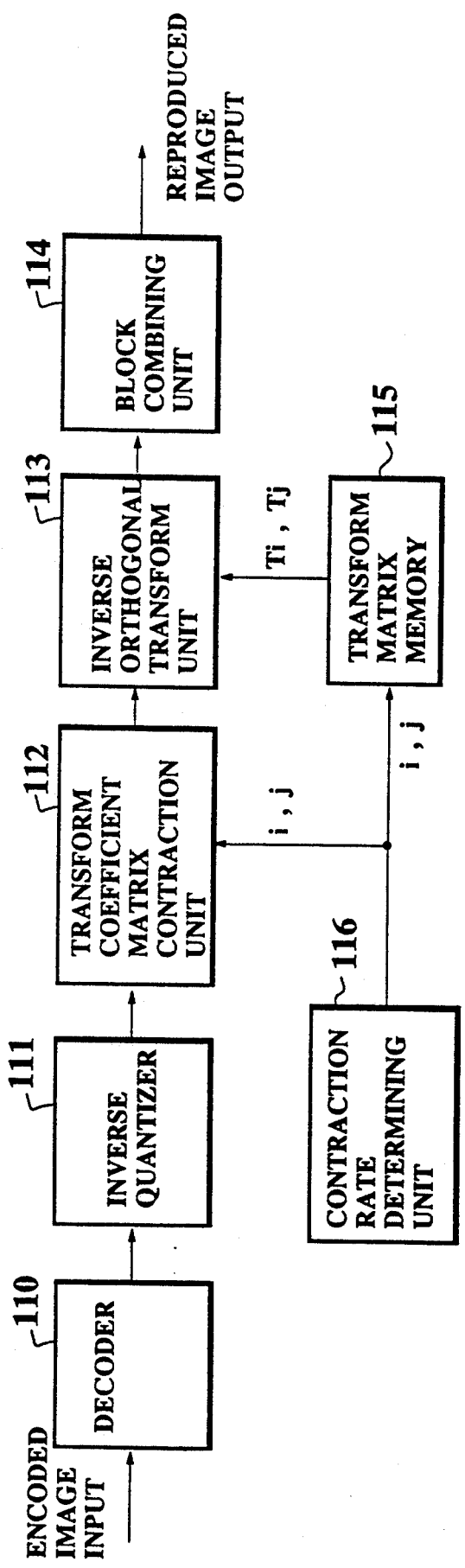

FIG.20

$$\begin{Bmatrix} 0.3536 & 0.4904 & 0.4619 & 0.4157 & 0.3536 & 0.2778 & 0.1913 & 0.0975 \\ 0.3536 & 0.4157 & 0.1913 & -0.0975 & -0.3536 & -0.4904 & -0.4619 & -0.2778 \\ 0.3536 & 0.2778 & -0.1913 & -0.4904 & -0.3536 & 0.0975 & 0.4619 & 0.4157 \\ 0.3536 & 0.0975 & -0.4619 & -0.2778 & 0.3536 & 0.4157 & -1.1913 & -0.4904 \\ 0.3536 & -0.0975 & -0.4619 & 0.2778 & 0.3536 & -0.4157 & -0.1913 & 0.4909 \\ 0.3536 & -0.2778 & -0.1913 & 0.4904 & -0.3536 & -0.0975 & 0.4619 & -0.4157 \\ 0.3536 & -0.4157 & 0.1913 & 0.0975 & -0.3536 & 0.4904 & -0.4619 & 0.2778 \\ 0.3536 & -0.4904 & 0.4619 & -0.4157 & 0.3536 & -0.2778 & 0.1913 & -0.0975 \end{Bmatrix}$$

FIG. 21

$$T_N^t \times (N \times M \text{ block}) \times T_M = \text{Transform Coefficient Matrix (quantized by step size 1)}$$

N-th degree transform matrix ($T_N^t$):

$$\begin{pmatrix}
0.3536 & 0.3536 & 0.3536 & 0.3536 & 0.3536 & 0.3536 & 0.3536 & 0.3536 \\
0.4904 & 0.4157 & 0.2778 & 0.0975 & -0.0975 & -0.2778 & -0.4157 & -0.4904 \\
0.4619 & 0.1913 & -0.1913 & -0.4619 & -0.4619 & -0.1913 & 0.1913 & 0.4619 \\
0.4157 & -0.0975 & -0.4904 & -0.2778 & 0.2778 & 0.4904 & 0.0975 & -0.4157 \\
0.3536 & -0.3536 & -0.3536 & 0.3536 & 0.3536 & -0.3536 & -0.3536 & 0.3536 \\
0.2778 & -0.4904 & 0.0975 & 0.4157 & -0.4157 & -0.0975 & 0.4904 & -0.2778 \\
0.1913 & -0.4619 & 0.4619 & -0.1913 & -0.1913 & 0.4619 & -0.4619 & 0.1913 \\
0.0975 & -0.2778 & 0.4157 & -0.4904 & 0.4904 & -0.4157 & 0.2778 & -0.0975
\end{pmatrix}$$

N×M block:

$$\begin{pmatrix}
10 & 10 & 10 & 10 & 10 & 10 & 10 & 10 \\
10 & 10 & 10 & 10 & 10 & 10 & 50 & 50 \\
10 & 10 & 10 & 10 & 50 & 50 & 50 & 50 \\
10 & 10 & 50 & 50 & 50 & 50 & 10 & 10 \\
10 & 10 & 50 & 50 & 50 & 50 & 10 & 10 \\
10 & 10 & 50 & 50 & 10 & 10 & 10 & 10 \\
10 & 50 & 50 & 10 & 10 & 10 & 10 & 10 \\
50 & 50 & 10 & 10 & 10 & 10 & 10 & 10
\end{pmatrix}$$

M-th degree transform matrix ($T_M$):

$$\begin{pmatrix}
0.3536 & 0.4904 & 0.4619 & 0.4157 & 0.3536 & 0.2778 & 0.1913 & 0.0975 \\
0.3536 & 0.4157 & 0.1913 & -0.0975 & -0.3536 & -0.4904 & -0.4619 & -0.2778 \\
0.3536 & 0.2778 & -0.1913 & -0.4904 & -0.3536 & 0.0975 & 0.4619 & 0.4157 \\
0.3536 & 0.0975 & -0.4619 & -0.2778 & 0.3536 & 0.4157 & -0.1913 & -0.4904 \\
0.3536 & -0.0975 & -0.4619 & 0.2778 & 0.3536 & -0.4157 & -0.1913 & 0.4904 \\
0.3536 & -0.2778 & -0.1913 & 0.4904 & -0.3536 & -0.0975 & 0.4619 & -0.4157 \\
0.3536 & -0.4157 & 0.1913 & 0.0975 & -0.3536 & 0.4904 & -0.4619 & 0.2778 \\
0.3536 & -0.4904 & 0.4619 & -0.4157 & 0.3536 & -0.2778 & 0.1913 & -0.0975
\end{pmatrix}$$

Transform coefficient matrix (quantized by step size 1):

$$\begin{pmatrix}
185 & 6 & -16 & -1 & -5 & -7 & 1 & -4 \\
-7 & -87 & -4 & 14 & 7 & 1 & 9 & -2 \\
-20 & 8 & 76 & 2 & -7 & -9 & 1 & -5 \\
-6 & 23 & -3 & -58 & 6 & 1 & 8 & -1 \\
-15 & 6 & -16 & -1 & 35 & -7 & 1 & -4 \\
-4 & 16 & -2 & 8 & 4 & -9 & 5 & 1 \\
-8 & 3 & -9 & -1 & -3 & -4 & -16 & -2 \\
-1 & 5 & -1 & 3 & 1 & 0 & 2 & 34
\end{pmatrix}$$

$T_1 = [0.3536]$ $$T_2 = \begin{bmatrix} 0.3536 & 0.3536 \\ 0.3536 & -0.3536 \end{bmatrix}$$

$$T_3 = \begin{bmatrix} 0.3536 & 0.4330 & 0.2500 \\ 0.3536 & 0.0000 & -0.5000 \\ 0.3536 & -0.4330 & 0.2500 \end{bmatrix}$$

$$T_4 = \begin{bmatrix} 0.3536 & 0.4619 & 0.3536 & 0.1913 \\ 0.3536 & 0.1913 & -0.3536 & -0.4619 \\ 0.3536 & -0.1913 & -0.3536 & 0.4619 \\ 0.3536 & -0.4619 & 0.3536 & -0.1913 \end{bmatrix}$$

$$T_5 = \begin{bmatrix} 0.3536 & 0.4755 & 0.4045 & 0.2939 & 0.1545 \\ 0.3536 & 0.2939 & -0.1545 & -0.4755 & -0.4045 \\ 0.3536 & 0.0000 & -0.5000 & 0.0000 & 0.5000 \\ 0.3536 & -0.2939 & -0.1545 & 0.4755 & -0.4045 \\ 0.3536 & -0.4755 & 0.4045 & -0.2939 & 0.1545 \end{bmatrix}$$

$$T_6 = \begin{bmatrix} 0.3536 & 0.4830 & 0.4330 & 0.3536 & 0.2500 & 0.1294 \\ 0.3536 & 0.3536 & 0.0000 & -0.3536 & -0.5000 & -0.3536 \\ 0.3536 & 0.1294 & -0.4330 & -0.3536 & 0.2500 & 0.4830 \\ 0.3536 & -0.1294 & -0.4330 & 0.3536 & 0.2500 & -0.4830 \\ 0.3536 & -0.3536 & 0.0000 & 0.3536 & -0.5000 & 0.3536 \\ 0.3536 & -0.4830 & 0.4330 & -0.3536 & 0.2500 & -0.1294 \end{bmatrix}$$

$$T_7 = \begin{bmatrix} 0.3536 & 0.4875 & 0.4505 & 0.3909 & 0.3117 & 0.2169 & 0.1113 \\ 0.3536 & 0.3909 & 0.1113 & 0.2169 & -0.4505 & -0.4875 & -0.3117 \\ 0.3536 & 0.2169 & -0.3117 & -0.4875 & -0.1113 & 0.3909 & 0.4505 \\ 0.3536 & 0.0000 & -0.5000 & 0.0000 & 0.5000 & 0.0000 & -0.5000 \\ 0.3536 & -0.2169 & -0.3117 & 0.4875 & -0.1113 & -0.3909 & 0.4505 \\ 0.3536 & -0.3909 & 0.1113 & 0.2169 & -0.4505 & 0.4875 & -0.3117 \\ 0.3536 & -0.4875 & 0.4505 & -0.3909 & 0.3117 & -0.2169 & 0.1113 \end{bmatrix}$$

$$T_8 = \begin{bmatrix} 0.3536 & 0.4904 & 0.4619 & 0.4157 & 0.3536 & 0.2778 & 0.1913 & 0.0975 \\ 0.3536 & 0.4157 & 0.1913 & -0.0975 & -0.3536 & -0.4904 & -0.4519 & -0.2778 \\ 0.3536 & 0.2778 & -0.1913 & -0.4904 & -0.3536 & 0.0975 & 0.4619 & 0.4157 \\ 0.3536 & 0.0975 & -0.4619 & -0.2778 & 0.3536 & 0.4157 & -0.1913 & -0.4909 \\ 0.3536 & -0.0975 & -0.4619 & 0.2778 & 0.3536 & -0.4175 & -0.1913 & 0.4940 \\ 0.3536 & -0.2778 & -0.1913 & 0.4940 & -0.3536 & -0.0975 & 0.4619 & -0.4157 \\ 0.3536 & -0.4157 & 0.1913 & 0.0975 & -0.3536 & 0.4904 & -0.4619 & 0.2778 \\ 0.3536 & -0.4909 & 0.4619 & -0.4157 & 0.3536 & -0.2778 & 0.1913 & -0.0975 \end{bmatrix}$$

FIG. 23

FIG. 24 i-TH DEGREE TRANSFORM MATRIX (Ti) →
$$\begin{bmatrix} 0.3536 & 0.4330 & 0.2500 \\ 0.3536 & 0.0000 & -0.5000 \\ 0.3536 & -0.4330 & 0.2500 \end{bmatrix}$$

×

CONTRACTED TRANSFORM COEFFICIENT MATRIX →
$$\begin{bmatrix} 185. & 6. & -16. & -4. \\ -7. & -87. & 8. & 76. \\ -20. & 8. & & \end{bmatrix}$$

× j-TH DEGREE TRANSFORM MATRIX ($T_j^t$) →
$$\begin{bmatrix} 0.3536 & 0.3536 & 0.3536 \\ 0.4330 & 0.0000 & -0.4300 \\ 0.2500 & -0.5000 & 0.2500 \end{bmatrix}$$

i×j BLOCK →
$$\begin{bmatrix} 9. & 14. & 38. \\ 15. & 48. & 16. \\ 44. & 15. & 8. \end{bmatrix}$$

$$\begin{pmatrix}
0.3536 & 0.4938 & 0.4755 & 0.4455 & 0.4045 & 0.3536 & 0.2939 & 0.2270 & 0.1545 & 0.0782 \\
0.3536 & 0.4455 & 0.2939 & 0.0782 & -0.1545 & -0.3536 & -0.4755 & -0.4938 & -0.4045 & -0.2270 \\
0.3536 & 0.3536 & 0.0000 & -0.3536 & -0.5000 & -0.3536 & 0.0000 & 0.3536 & 0.5000 & 0.3536 \\
0.3536 & 0.2270 & -0.2923 & -0.4938 & -0.1545 & 0.3536 & 0.4755 & 0.0782 & -0.4045 & -0.4455 \\
0.3536 & 0.0782 & -0.4755 & -0.2270 & 0.4045 & 0.3536 & -0.2939 & -0.4455 & 0.1545 & 0.4938 \\
0.3536 & -0.0782 & -0.4755 & 0.2270 & 0.4045 & -0.3536 & -0.2939 & 0.4455 & 0.1545 & -0.4938 \\
0.3536 & -0.2270 & -0.2739 & 0.4938 & -0.1545 & -0.3536 & 0.4755 & -0.0782 & -0.4045 & 0.4455 \\
0.3536 & -0.3536 & 0.0000 & 0.3536 & -0.5000 & 0.3536 & 0.0000 & -0.3536 & 0.5000 & -0.3536 \\
0.3536 & -0.4455 & 0.2939 & -0.0782 & -0.1545 & 0.3536 & -0.4755 & 0.4936 & -0.4045 & 0.2270 \\
0.3536 & -0.4938 & 0.4755 & -0.4455 & 0.4045 & -0.3536 & 0.2939 & -0.2270 & 0.1545 & -0.0782
\end{pmatrix}$$

$$T_{16} =$$

$$\begin{pmatrix}
0.3536 & 0.4976 & 0.4904 & 0.4785 & 0.4619 & 0.4410 & 0.4157 & 0.3865 & 0.3536 & 0.3172 & 0.2778 & 0.2357 & 0.1913 & 0.1451 & 0.0975 & 0.0490 \\
0.3536 & 0.4785 & 0.4157 & 0.3172 & 0.1913 & 0.0490 & -0.0975 & -0.2357 & -0.3536 & -0.4410 & -0.4904 & -0.4976 & -0.4619 & -0.3865 & -0.2778 & -0.1451 \\
0.3536 & 0.4410 & 0.2778 & 0.0490 & -0.1913 & -0.3865 & -0.4904 & -0.4785 & -0.3536 & -0.1451 & 0.0975 & 0.3172 & 0.4619 & 0.4976 & 0.4157 & 0.2357 \\
0.3536 & 0.3865 & 0.0975 & -0.2357 & -0.4619 & -0.4785 & -0.2778 & 0.0490 & 0.3536 & 0.4976 & 0.4157 & 0.1451 & -0.1913 & -0.4410 & -0.4904 & -0.3172 \\
0.3536 & 0.3172 & -0.0975 & -0.4410 & -0.4619 & -0.1451 & 0.2778 & 0.4976 & 0.3536 & -0.0490 & -0.4157 & -0.4785 & -0.1913 & 0.2357 & 0.4904 & 0.3865 \\
0.3536 & 0.2357 & -0.2778 & -0.4976 & -0.1913 & 0.3172 & 0.4904 & 0.1451 & -0.3536 & -0.4785 & -0.0975 & 0.4410 & 0.4619 & 0.0490 & -0.4157 & -0.4410 \\
0.3536 & 0.1451 & -0.4157 & -0.3865 & 0.1913 & 0.4976 & 0.0975 & -0.4410 & -0.3536 & 0.2357 & 0.4904 & 0.0490 & -0.4619 & -0.3172 & 0.2778 & 0.4785 \\
0.3536 & 0.0490 & -0.4904 & -0.1451 & 0.4619 & 0.2357 & -0.4157 & -0.3172 & 0.3536 & 0.3865 & -0.2778 & -0.4410 & 0.1913 & 0.4785 & -0.0975 & -0.4976 \\
0.3536 & -0.0490 & -0.4904 & 0.1451 & 0.4619 & -0.2357 & -0.4157 & 0.3172 & 0.3536 & -0.3865 & -0.2778 & 0.4410 & 0.1913 & -0.4785 & -0.0975 & 0.4976 \\
0.3536 & -0.1451 & -0.4157 & 0.3865 & 0.1913 & -0.4976 & 0.0975 & 0.4410 & -0.3536 & -0.2357 & 0.4904 & -0.0490 & -0.4619 & 0.3172 & 0.2778 & -0.4785 \\
0.3536 & -0.2357 & -0.2778 & 0.4976 & -0.1913 & -0.3172 & 0.4904 & -0.1451 & -0.3536 & 0.4785 & -0.0975 & -0.4410 & 0.4619 & -0.0490 & -0.4157 & 0.4410 \\
0.3536 & -0.3172 & -0.0975 & 0.4410 & -0.4619 & 0.1451 & 0.2778 & -0.4976 & 0.3536 & 0.0490 & -0.4157 & 0.4785 & -0.1913 & -0.2357 & 0.4904 & -0.3865 \\
0.3536 & -0.3865 & 0.0975 & 0.2357 & -0.4619 & 0.4785 & -0.2778 & -0.0490 & 0.3536 & -0.4976 & 0.4157 & -0.1451 & -0.1913 & 0.4410 & -0.4904 & 0.3172 \\
0.3536 & -0.4410 & 0.2778 & -0.0490 & -0.1913 & 0.3865 & -0.4904 & 0.4785 & -0.3536 & 0.1451 & 0.0975 & -0.3172 & 0.4619 & -0.4976 & 0.4175 & -0.2357 \\
0.3536 & -0.4785 & 0.4157 & -0.3172 & 0.1913 & -0.0490 & -0.0975 & 0.2357 & -0.3536 & 0.4410 & -0.4904 & 0.4976 & -0.4619 & 0.3865 & -0.2778 & 0.1451 \\
0.3536 & -0.4976 & 0.4904 & -0.4785 & 0.4619 & -0.4410 & 0.4157 & -0.3865 & 0.3536 & -0.3172 & 0.2778 & -0.2357 & 0.1913 & -0.1451 & 0.0975 & -0.0490
\end{pmatrix}$$

FIG.27

I-TH DEGREE TRANSFORM MATRIX ($T_I$) × EXPANDED TRANSFORM COEFFICIENT MATRIX × J-TH DEGREE TRANSFORM MATRIX ($T_j^t$) = I×J BLOCK

FIG.31

$$N\left\{i\left\{\begin{array}{cccccccc}\overbrace{\phantom{180.\quad 0.\ -20.\quad 0.\quad 0.\quad 0.\quad 0.\quad 0.}}^{M} \\ \overbrace{\phantom{180.\quad 0.\ -20.\quad 0.\quad 0.\quad 0.\quad 0.\quad 0.}}^{j} \\ 180. & 0. & -20. & 0. & 0. & 0. & 0. & 0. \\ 0. & -80. & 0. & 20. & 0. & 0. & 0. & 0. \\ -20. & 0. & 80. & 0. & 0. & 0. & 0. & 0. \\ 0. & 20. & 0. & -60. & 0. & 0. & 0. & 0. \\ -20. & 0. & -20. & 0. & 40. & 0. & 0. & 0. \\ 0. & 20. & 0. & 0. & 0. & 0. & 0. & 0. \\ 0. & 0. & 0. & 0. & 0. & 0. & -20. & 0. \\ 0. & 0. & 0. & 0. & 0. & 0. & 0. & 0. \end{array}\right.\right.$$

FIG.32

$$\begin{bmatrix} 0.3536 & 0.4875 & 0.4505 & 0.3909 & 0.3117 & 0.2169 & 0.1113 & \cdots \\ 0.3536 & 0.3909 & 0.1113 & -0.2169 & -0.4505 & -0.4875 & -0.3117 & \cdots \\ 0.3536 & 0.2169 & -0.3117 & -0.4875 & -0.1113 & 0.3909 & 0.4505 & \cdots \\ 0.3536 & 0.0000 & -0.5000 & 0.0000 & 0.5000 & 0.0000 & -0.5000 & \cdots \\ 0.3536 & -0.2169 & -0.3117 & 0.4875 & -0.1113 & -0.3909 & 0.4505 & \cdots \\ 0.3536 & -0.3909 & 0.1113 & 0.2169 & -0.4505 & 0.4875 & -0.3117 & \cdots \\ 0.3536 & -0.4875 & 0.4505 & -0.3909 & 0.3117 & -0.2169 & 0.1113 & \cdots \\ \cdots & \cdots & \cdots & \cdots & \cdots & \cdots & \cdots & \cdots \end{bmatrix}$$ ⟵ N-TH DEGREE TRANSFORM MATRIX (T'i)

\* : ARBITRARY

×

$$\begin{bmatrix} 180. & 0. & -20. & 0. & 0. & 0. & 0. & \cdots \\ 0. & -80. & 0. & 20. & 0. & 0. & 0. & \cdots \\ -20. & 0. & 80. & 0. & 0. & 0. & 0. & \cdots \\ 0. & 20. & 0. & -60. & 0. & 0. & 0. & \cdots \\ 0. & 0. & 0. & 0. & 40. & 0. & 0. & \cdots \\ -20. & 0. & 20. & 0. & 0. & 0. & -20. & \cdots \\ 0. & 0. & 0. & 0. & 0. & 0. & 0. & \cdots \\ 0. & 0. & 0. & 0. & 0. & 0. & 0. & \cdots \\ \cdots & \cdots & \cdots & \cdots & \cdots & \cdots & \cdots & \cdots \end{bmatrix}$$ ⟵ N×M TRANSFORM COEFFICIENT MATRIX $$\begin{bmatrix} 0.3536 & 0.3536 & 0.3536 & 0.3536 & 0.3536 & 0.3536 & 0.3536 & \cdots \\ 0.4875 & 0.3909 & 0.2169 & 0.0000 & -0.2169 & -0.3909 & -0.4875 & \cdots \\ 0.4505 & 0.1113 & -0.3117 & -0.5000 & -0.3117 & 0.1113 & 0.4505 & \cdots \\ 0.3909 & -0.2169 & -0.4875 & 0.0000 & 0.4875 & 0.2169 & -0.3909 & \cdots \\ 0.3117 & -0.4505 & -0.1113 & 0.5000 & -0.1113 & -0.4505 & 0.3111 & \cdots \\ 0.2169 & -0.4875 & 0.3909 & 0.0000 & -0.3909 & 0.4875 & -0.2169 & \cdots \\ 0.1113 & -0.3117 & 0.4505 & -0.5000 & 0.4505 & -0.3117 & 0.1113 & \cdots \\ \cdots & \cdots & \cdots & \cdots & \cdots & \cdots & \cdots & \cdots \end{bmatrix}$$ ⟵ M-TH DEGREE TRANSFORM MATRIX (T'j)

=

$$\begin{bmatrix} 13. & 7. & 8. & 13. & 7. & 22. & 49. & \cdots \\ 11. & 10. & 6. & 7. & 46. & 55. & 39. & \cdots \\ 13. & 12. & 11. & 43. & 52. & 42. & 6. & \cdots \\ 4. & 4. & 43. & 56. & 43. & 4. & 4. & \cdots \\ 6. & 42. & 52. & 43. & 11. & 12. & 13. & \cdots \\ 39. & 55. & 46. & 7. & 6. & 10. & 11. & \cdots \\ 49. & 22. & 7. & 13. & 8. & 7. & 13. & \cdots \\ \cdots & \cdots & \cdots & \cdots & \cdots & \cdots & \cdots & \cdots \end{bmatrix}$$ ⟵ N×M BLOCK

\* : NOT USED

SYSTEM FOR TRANSMITTING ENCODED IMAGE DATA WITH QUICK IMAGE EXPANSION AND CONTRACTION

BACKGROUND OF THE INVENTION

1. Field of the Invention

The present invention relates to a system for transmitting encoded signals representing image data, and more particularly, to such a system used in a TV conference system and TV telephone system using ATM (asynchronous transfer mode) network by which a multiple view image data are produced from a plurality of image data transmitted in the ATM network.

2. Description of the Background Art

A TV conference system is a system for enabling a conference among distanced participants by providing audio and visual communications among the participants through a communication network connecting a plurality of display terminals, so as to simulate a conference in a conference room. Currently, a progress has been made in realizing such a TV conference system by utilizing a wide range ISDN ATM network.

In this TV conference system, it is usually necessary to provide each display terminal of each participant with views of the other participants on a single display, in a form of a multiple view image produced by contracting each view of each participant and arranging such contracted views of the other participants on a single display.

For this reason, a data transmission in such a TV conference system takes a form of encoding the image data at each user terminal and transmitting the encoded image data through the ATM network; producing the encoded multiple view image data at an image bridge circuit in the ATM network from a plurality of encoded image data transmitted in the ATM network by applying an image contraction processing; and decoding the encoded multiple view image data transmitted through the ATM network at each user terminal.

Conventionally, such an image bridge circuit in the ATM network operates by first decoding the encoded image data received from the user terminal through the ATM network, then producing the multiple view image data by applying an image contraction processing to each decoded image data and arranging such contracted image data, and encoding the obtained multiple view image data and transmitting the encoded multiple view image data out to the ATM network. Such a conventional image bridge circuit therefore required a plurality of decoders for decoding the plurality of image data from the plurality of user terminals connected to it, and one or more encoders for encoding the image obtained by it, so that the size of the image bridge circuit itself inevitably becomes quite large, which consequently also contributed to the undesirable increase of the size of the system as a whole.

Moreover, the processing at the conventional image bridge circuit with the configuration described above can be quite time consuming, especially when the number of users becomes large, to a point of causing a practically problematic and undesirable delay in the data transmission, and yet this problem of the delay in the data transmission due to the time consuming processing at the image bridge circuit can be alleviated only by severely limiting a number of user terminals involved in the TV conference system to an unreasonably small number.

More specifically, the image data have been expanded or contracted conventionally by row by row (or column by column) filtering and sub-sampling for the case of contraction, and row by row (or column by column) filtering and interpolation for the case of expansion, which will now be descried in terms of diagrams shown in FIGS. 1(A) to 1(E).

FIG. 1(A) is a diagram showing picture element values for one row of the picture elements in an image in a form of a wave. By Fourier transforming this diagram of FIG. 1(A), a frequency characteristic shown in FIG. 1(B) can be obtained. In FIG. 1(B), fm indicates a sampling frequency.

In a case of contracting, in order to reduce a number of picture elements, the sampling frequency have to be lowered from fm to a lower frequency fx. Here, the high frequency components in the original signals are suppressed by using an appropriate filtering such as shown in FIG. 1(C) in order to avoid the turning back of the frequency components between $(\frac{1}{2})fx$ and $(\frac{1}{2})fm$ to obtain the frequency characteristic for the contracted image shown in FIG. 1(D).

On the other hand, in a case of expanding, the sampling frequency is raised from fm to a higher frequency fy, and by using an appropriate filtering the frequency characteristic for the expanded image shown in FIG. 1(E) can be obtained.

Now, for encoding the image data, there is a method known as an orthogonal transform encoding in which the image is divided into a plurality of (usually rectangular) blocks and the orthogonal transform is carried out for each one of these blocks, and then the transform coefficients of the orthogonal transform are quantized and encoded.

In a case of expanding or contracting the image data encoded by such an encoding method, it has conventionally been necessary to reproduce the entire original image by decoding, before the application the sub-sampling or interpolation operation for the sake of contraction or expansion.

For this reason, it has conventionally necessary to separately provide a circuit for reproducing the entire original image, a frame memory capable of memorizing the entire original image, and a circuit for applying an operation for the expansion and contraction.

Moreover, such a conventional method of expanding or contracting the encoded image data is quite time consuming as it involves the reproduction of the entire original image.

SUMMARY OF THE INVENTION

It is therefore an object of the present invention to provide a system for transmitting encoded image data capable of producing and transmitting the multiple view image data, without causing a significant level of an increase of a size of the system, a delay in a data transmission, and a limitation on a number of communication channels.

It is another object of the present invention to provide a method for decoding the encoded image data quickly, by eliminating the reproduction of the entire original image from the process of expanding or contracting.

According to one aspect of the present invention there is provided a system for transmitting encoded image data through an ATM network, comprising:

image encoder means, provided in each of a plurality of user terminals of the ATM network, for encoding orthogonal transform coefficient data obtained by applying an orthogonal transform to image data, and transmitting encoded image data in which the encoded orthogonal transform coefficient data are classified according to their degrees, through the ATM network; image processing means for receiving the encoded image data from the image encoder means, and transmitting processed image data containing the encoded orthogonal transform coefficient data in the encoded image data along with a size change rate information indicating a size change rate by which a size of the image data are to be changed, through the ATM network; and image decoder means, provided in each of a plurality of user terminals of the ATM network, for receiving the processed image data from the image processing means, and decoding the encoded orthogonal transform coefficient data in the processed image data into a degree corresponding to the size change rate indicated by the size change rate information in the processed image data by applying an inverse orthogonal transform of said degree to the encoded orthogonal transform coefficient data.

According to another aspect of the present invention there is provided a method of decoding encoded image data encoded by using an orthogonal transform of a given degree, comprising the steps of: selecting transform matrices having degrees different from said given degree; and applying inverse orthogonal transform to orthogonal transform coefficient matrix for the encoded image data by using the transform matrices selected at the selecting steps, to obtain decoded image data.

Other features and advantages of the present invention will become apparent from the following description taken in conjunction with the accompanying drawings.

BRIEF DESCRIPTION OF THE DRAWINGS

FIGS. 1(A) to 1(E) are diagrams for explaining a conventional method of expanding or contracting image data.

FIG. 11 is a detail block diagram of an image decoder in the system of FIG. 2.

FIG. 19 is a block diagram of an apparatus for encoding image data used in preparing the encoded image data input.

FIG. 20 is an illustration of an example of a transform matrix used in the apparatus of FIG. 19.

FIG. 21 is an illustration of an example of a calculation for the orthogonal transform used in the apparatus of FIG. 19.

FIG. 22 is a block diagram of one embodiment of an apparatus for contracting encoded image data according to the present invention.

FIG. 23 is an illustration of examples of transform matrices used in the apparatus of FIG. 22.

FIG. 24 is an illustration of an example of a calculation for the inverse orthogonal transform used in the apparatus of FIG. 22.

FIG. 26 is an illustration of examples of transform matrices used in the apparatus of FIG. 25.

FIG. 27 is an illustration of an example of a calculation for the inverse orthogonal transform used in the apparatus of FIG. 25.

FIG. 31 is an illustration of an example of a transform coefficient matrix used in the apparatus of FIG. 30.

FIG. 32 is an illustration of an example of a calculation for the inverse orthogonal transform used in the apparatus of FIG. 30.

DETAILED DESCRIPTION OF THE PREFERRED EMBODIMENTS

Figure 2:
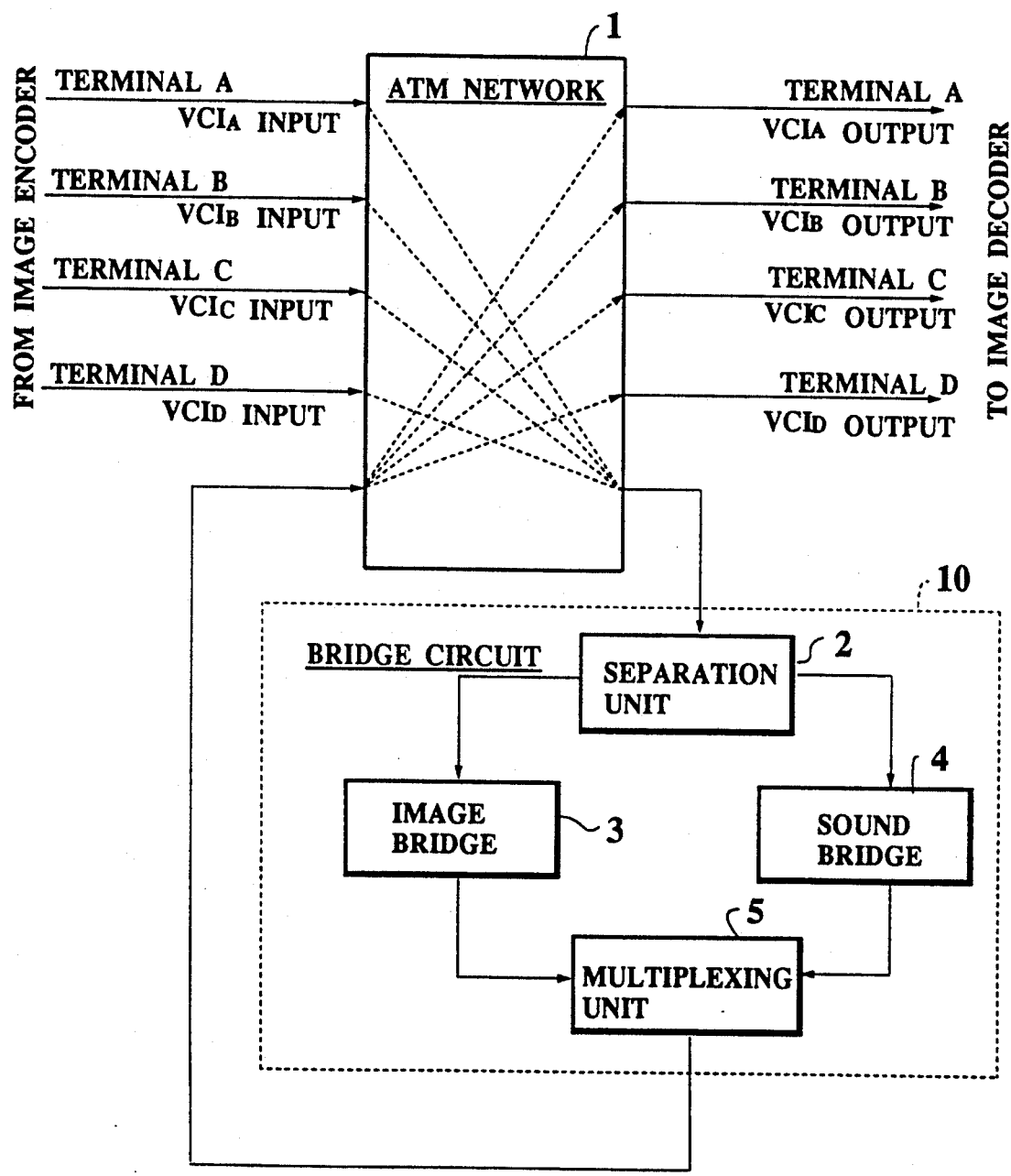
FIG. 2 is a schematic block diagram of one embodiment of a system for transmitting encoded image data according to the present invention.

Referring now to FIG. 2, one embodiment of a system for transmitting encoded image data according to the present invention will be described in detail.

In this system, each user terminal (not shown) is provided with an image encoder (not shown, to be described in detail below) for obtaining the encoded image data, and the encoded image data and the encoded sound data accompanied by VCI (virtual channel identification) in their header sections are transmitted from each user terminal to an ATM network 1.

The ATM network 1 is equipped with a bridge circuit 10 comprising: a separation unit 2 for separating the encoded image data and the encoded sound data in accordance with the VCI; an image bridge 3, to be described in detail below, for processing the encoded image data separated by the separation unit 2 to obtain the multiple view image data; a sound bridge 4, to be described in detail below, for processing the encoded sound data separated by the separation unit 2; and a multiplexing unit 5 for multiplexing the encoded image data processed by the image bridge and the encoded sound data processed by the sound bridge and outputting them to the ATM network 1.

The encoded image data and the encoded sound data transmitted from the bridge circuit 10 to the ATM network 1 are then transmitted to each user terminal, where the encoded image data are decoded by an image decoder (not shown, to be described in detail below) provided in each user terminal.

Figure 3:
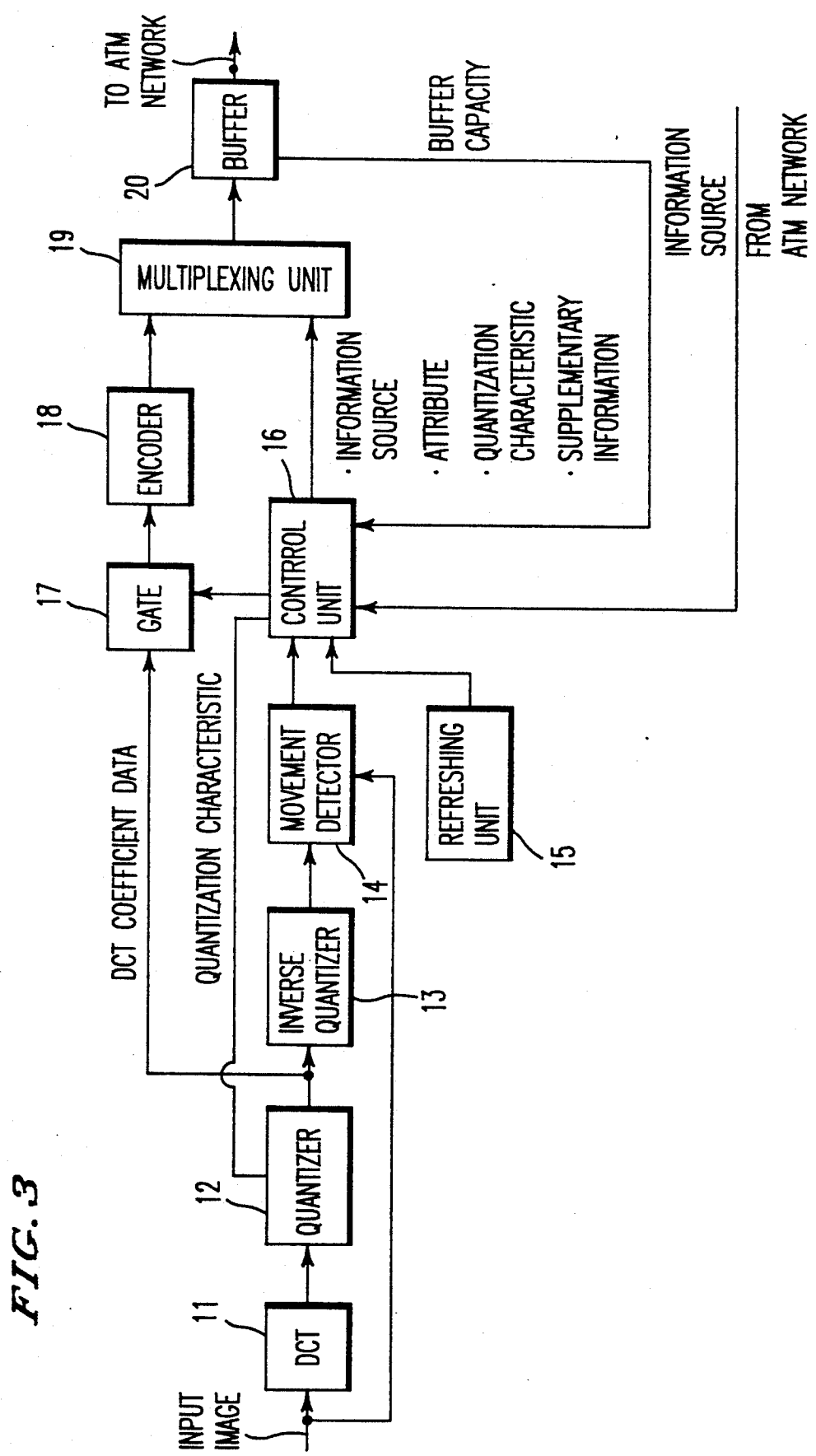
FIG. 3 is a detail block diagram of an image encoder in the system of FIG. 2.

Referring now to FIG. 3, the image encoder provided in each user terminal in the system of FIG. 2 will be described in detail.

This image encoder comprises: a DCT (discrete cosine transform) unit 11 receiving the input image data; a quantizer 12 connected with the DCT unit 11; an inverse quantizer 13 connected with the quantizer 13; a movement detector 14 connected with the inverse quantizer 13 which also receives the input image data; a gate unit 17 connected with the quantizer 12; an encoder 18 connected with the gate unit 17; a multiplexing unit 19 connected with the encoder 18; a buffer 20 connected with the multiplexing unit 19; a control unit 16 connected with the movement detector 14, buffer 20, and external ATM network 1 which controls the quantizer 12, gate unit 17 and multiplexing unit 19; and a refreshing unit 15 connected with the control unit 16.

In this image encoder of FIG. 3, the DCT unit 11 applies an orthogonal transform in a form of a two dimensional DCT of M×M block (8×8 block for instance) to the input image data obtained from image signals taken by a TV camera (not shown) and digitized by an A/D converter (not shown), in order to obtain DCT coefficients.

The DCT coefficients obtained by DCT unit 11 are then quantized by the quantizer 12 to obtain the quantized DCT coefficient data which are subsequently supplied to the gate unit 17 and the inverse quantizer 13.

At the inverse quantizer, the quantized DCT coefficient data from the quantizer 12 are inversely quantized in order to recover the unquantized DCT coefficients.

The unquantized DCT coefficients obtained by the inverse quantizer 13 are then supplied to the movement detector 14 having a memory for memorizing a preceding image data, and compared with the preceding image data there to detect the movement.

The presence or absence of the movement detected by the movement detector 14 is then supplied to the control unit 16 along with refreshing signals from the refreshing unit 15. Here, the refreshing signals indicate the block to be treated as that containing the movement regardless of the detection by the movement detector, and the refreshing unit 15 outputs the refreshing signals for a predetermined number of blocks within each image, in order to cope with the packet loss in the ATM network.

The control unit 16 controls the gate unit 17 such that the gate unit 17 passes only those DCT coefficient data for the block for which the movement is detected by the movement detector 14 or for which the refreshing signals are outputted by the refreshing unit 15.

The control unit 16 then outputs supplementary information indicating the passing of the block according to the control of the gate unit 17 to the multiplexing unit 19, along with side information including information source, attribute, and quantization characteristic. The information source is supplied to the control unit 16 from the ATM network 1 and indicates names of the present terminal and image encoder by which they are identified in the ATM network 1. The attribute indicates a type of the information to be transmitted, and includes information for distinguishing the image data (DCT coefficient data) and letter message data, information for distinguishing luminance signals and color difference signals, and degree information indicating the degree of the DCT coefficient data. The quantization characteristic indicates a quantization characteristic such as a quantization step size determined in accordance with the available buffer capacity informed from the buffer 20, by which the quantizer 12 is controlled.

Figures 4, 5:
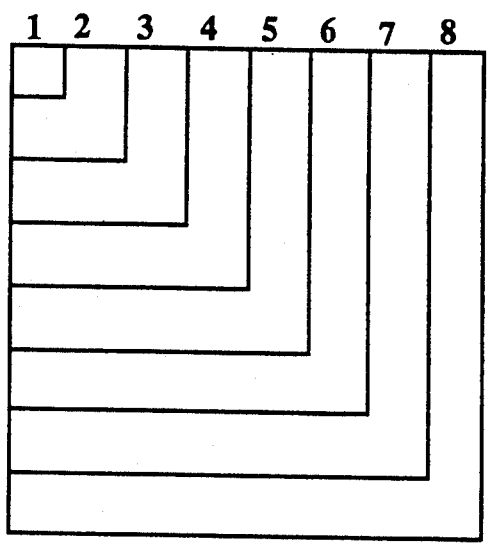
FIG. 4 is a diagram of DCT coefficient data for explaining the classification of the DCT coefficient data according to the degrees in the image encoder of FIG. 3.
FIG. 5 is a diagram of data cell and system cell to be transmitted in the system of FIG. 2.

The DCT coefficient data passed by the gate unit 17 are classified according to their degree and encoded in variable length (by Huffman encoding for example) at the encoder 18. Here, as shown in FIG. 4, the DCT coefficient data may be classified into 8 classes in terms of degrees, or into a number of classes in terms of groups containing more than one degrees each. The output of the encoder 18 is given in a form of variable length PCM data, such that the packet loss at one frame does not affect the next frame.

The encoded DCT coefficient data from the encoder 18 are then multiplexed with the supplementary information from the control unit 16 at the multiplexing unit 19, and the multiplexed data are transmitted to the ATM network 1 through the buffer 20, after the side informations provided by the control unit 16. Here, the buffer 20 functions to take a matching between the output rate of the multiplexing unit 19 and the transmission rate of the ATM network 1.

Logically, the data outputted from the image encoder of FIG. 3 are transmitted as a data cell represented by a payload section of a logical packet structure shown in FIG. 5 which is defined for each frame. Namely, in this data cell, a header section containing the side information including the information source, attribute, and quantization characteristic is followed by a data section containing the supplementary information and DCT coefficient data.

Figure 6:
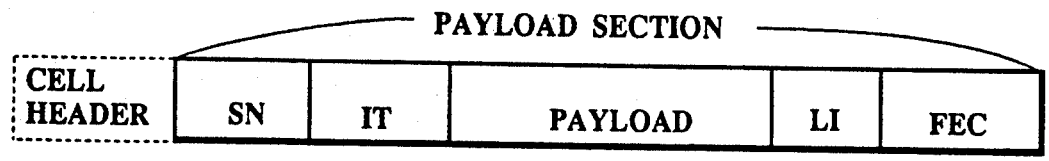
FIG. 6 is a diagram of a cell structure used for the cells to be transmitted in the system of FIG. 2.

In practice, the data outputted from the image encoder of FIG. 3 are transmitted to the bridge circuit 10 by dividing this data cell of FIG. 5 into n parts, and transmitting each of the divided part as a payload section of a cell shown in FIG. 6. The payload section of the cell of FIG. 6 contains: a sequence number SN; a cell type IT indicating a distinction between the header section and the data section of the logical packet structure of FIG. 5, a timing information, and a distinction between the image data and the sound data; a valid information length indication LI used in a cell having an empty region, and error correction codes FEC for correcting 2 bit error.

Figure 7:
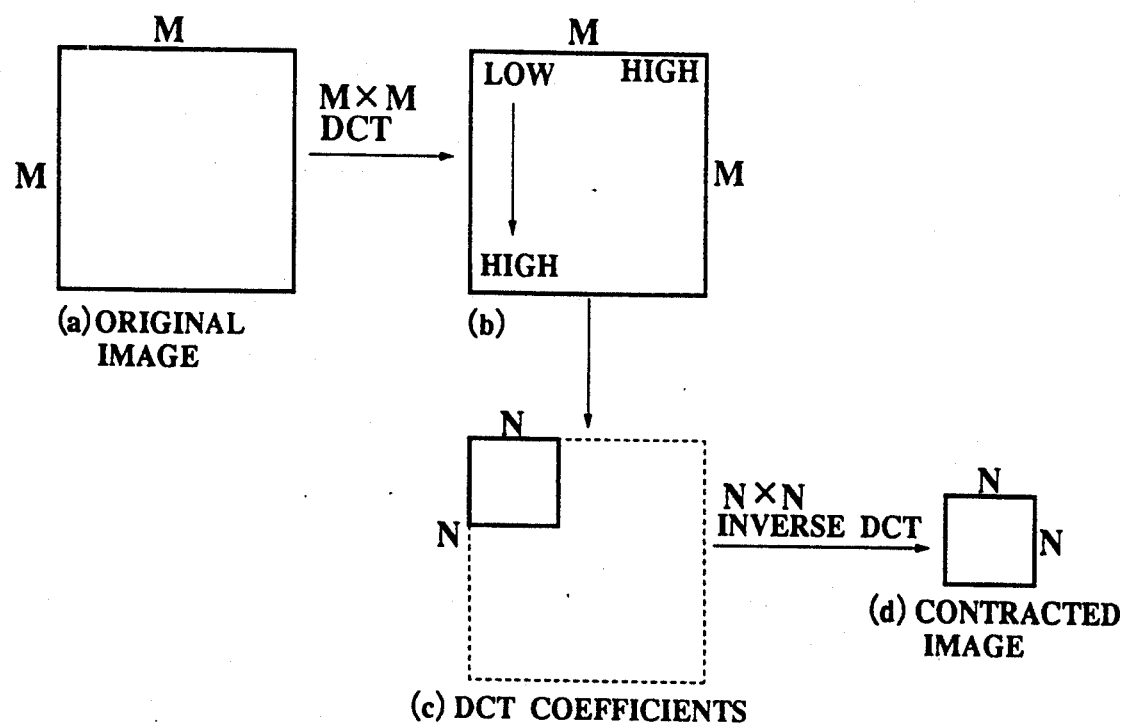
FIG. 7 is a schematic diagram for explaining the operation of contraction to be carried out in the system of FIG. 2.

The data from the image encoder of FIG. 3 transmitted through the ATM network 1 are then prepared for the contraction schematically shown in FIG. 7 at the bridge circuit 10.

Namely, the original image (a) of FIG. 7 is transformed into the M×M DCT coefficient data (b) of FIG. 7 at the image encoder of FIG. 3 as described above. A M×M matrix is defined as a square matrix having a "degree" or rank of M. The contraction of M×M DCT coefficient data to the contracted DCT coefficient data (c) of FIG. 7 in a form of N×N block (N<M) containing the DC component (upper left corner of the block) is achieved by carrying out N×N inverse DCT at the image decoder, so as to obtain the contracted image (d) of FIG. 7 with the contraction rate of (N/M)×(N/M). Here, N=1 to M−1, so that the contraction rate is limited by the value of M, but for the practical purpose M=8 is sufficient.

Figure 8:
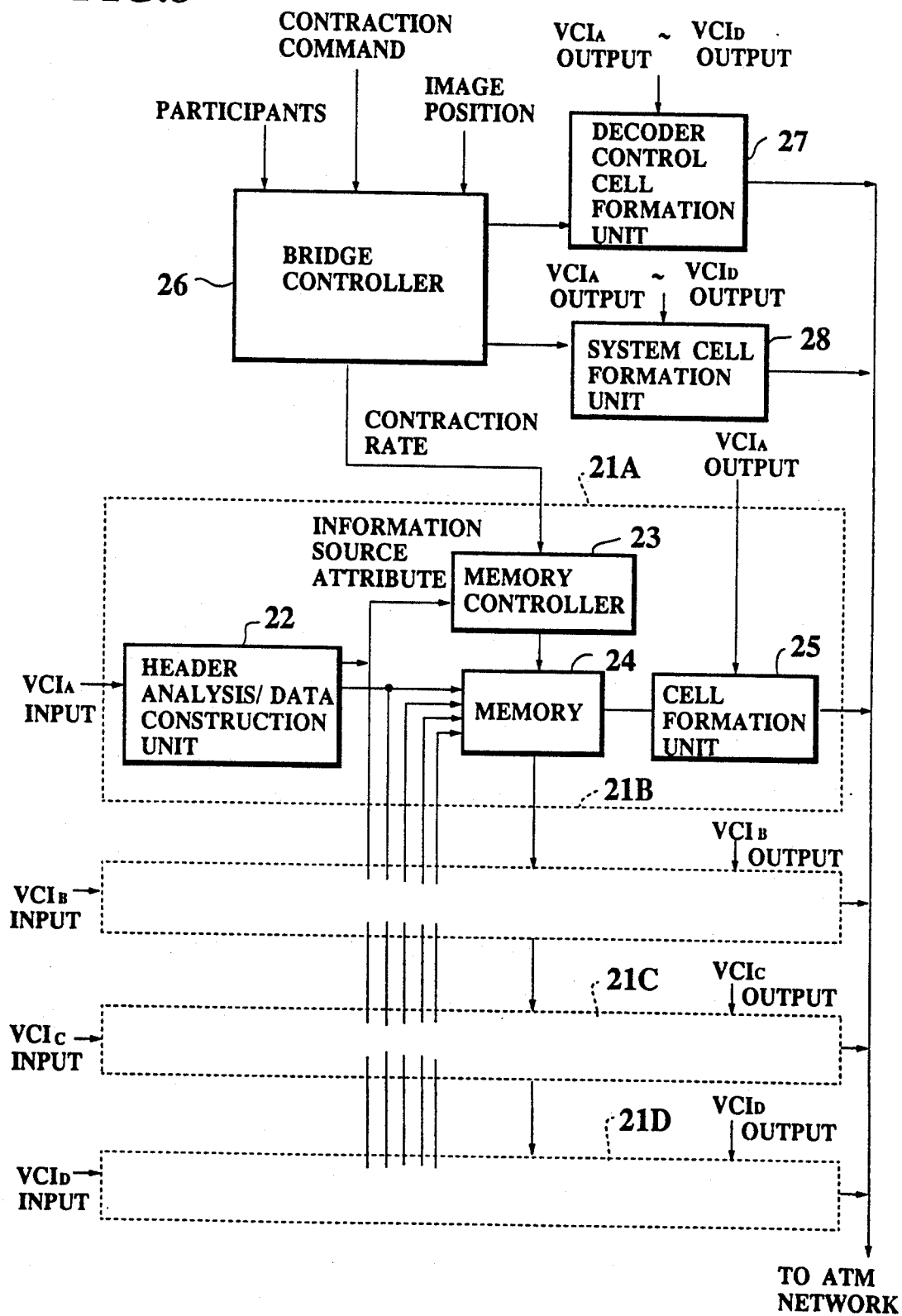
FIG. 8 is a detail block diagram of an image bridge in the bridge circuit of the system of FIG. 2.

To this end, the image bridge 3 in the bridge circuit 10 has a detail configuration shown in FIG. 8. This image bridge 3 of FIG. 8 determines the contraction rate and the image position for the image data transmitted from the image encoders or the user terminals, and transmits these informations along with the image data in a form of the DCT coefficient data up to the degree required by the determined contraction rate to the image decoders of the user terminals. In addition, the image bridge 3 may also function to superimpose the letter message data on the image data, and to generate the service image data to be transmitted to the user terminals.

This image bridge of FIG. 8 comprises: a plurality of processing blocks 21A to 21D provided in correspondence to a plurality of user terminals A to D, which operate in 8 bit parallel manner; a bridge controller 26 connected with the processing blocks 21A to 21D; a decoder control cell formation unit 27 connected with the bridge controller 26; and a system cell formation unit 28 connected with the bridge controller 26.

At each of the processing block 21A to 21D, the VCI accompanying the input data is recognized, and then the payload section of the cell of FIG. 6 is extracted. Then, at header analysis/data construction unit 22, the error correction using the error correction codes FEC is carried out first by the adaptation function, and then the sequence number SN, cell type IT, and valid information length indication LI are extracted. Then, after the consistency of the cell order is checked, the data cell of FIG. 5 is constructed according to the cell type IT. Here, the information source and the attribute contained in the top cell are separated and supplied to a memory controller 23, while the construction of the data cell is completed by extracting the information on the necessary length according to the valid information length in the last cell.

The memory controller 23 utilizes the information source and the attribute supplied from the header analysis/data construction unit 22 to determine the parts of the constructed data which are to be transmitted. Namely, the contraction rate is given from the bridge controller 26 to the memory controller 23 according to which the memory controller 23 determined the part of the DCT coefficient data up to the degree required by this contraction rate. The memory controller 23 accordingly controls a memory 24 to memorize those parts of the constructed data which are judged to be transmitted, along with the data constructed by the other processing blocks.

The data memorized in the memory 24 are decomposed into cells in a form shown in FIG. 6 by the adaptation function and the VCI is attached at a cell formation unit 25, and then transmitted to the ATM network 1.

Figures 9, 10, 12:
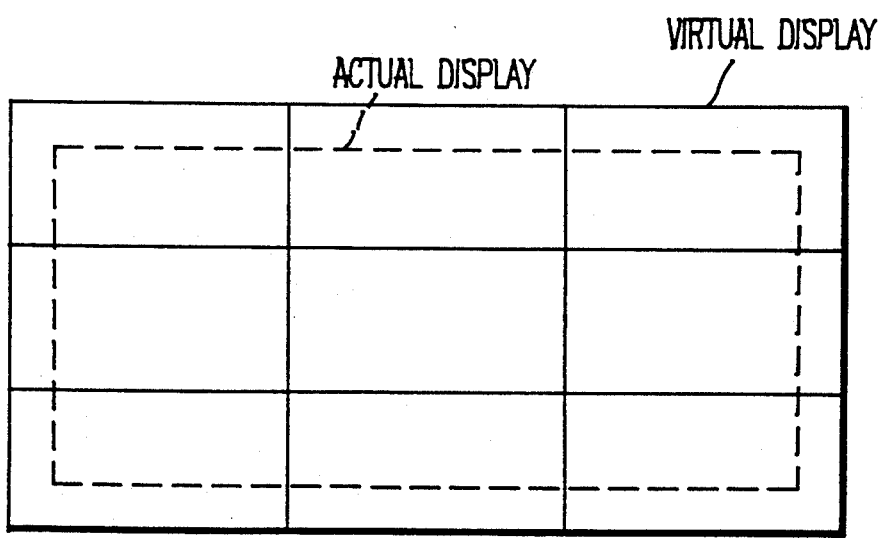
FIG. 9 is a diagram of one form of decoder control cell to be transmitted in the system of FIG. 2.
FIG. 10 is a diagram of another form of decoder control cell to be transmitted in the system of FIG. 2.
FIG. 12 is a diagram of a display obtained by the system of FIG. 2.

Meanwhile, the decoder control cell formation unit 27 constantly generates the decoder control cell in a form shown in FIG. 9 for the image data or in a form shown in FIG. 10 for the letter message data, and outputs the decoder control cell to the ATM network in a form of the cell shown in FIG. 6. The decoder control cell contains various commands for the image decoder. In a case of the image data, the decoder control cell of FIG. 9 contains the information source, attribute, virtual display definition, actual display definition, and number of information sources for the cell, as well as the information source indentification, contraction rate, image position and plane for each information source. In a case of letter message data, the decoder control cell of FIG. 10 contains the information source, attribute, and number of letter regions for the cell, as well as the letter region identification, display position, and display format for each letter region.

On the other hand, the system cell formation unit 28 generates the system cell in a form similar to that shown in FIG. 5 for the data cell, and outputs the system cell to the ATM network in a form of the cell shown in FIG. 6. This system cell has basically the same structure as the data cell expect for the inclusion of the letter message data in the data section. The letter message data includes message information such as telephone numbers and service image data.

The bridge controller 26 receives commands concerning the desired participants, contraction rate, and image position from each user terminal, and provide the contraction rate to the memory controller 23 while controlling the decoder control cell formation unit 27 and the system cell formation unit 28.

Thus, in this image bridge 3, the decoding and encoding of the DCT coefficient data for the purpose of carrying out the contraction operation are not involved, and instead the information concerning the contraction rate and the image position necessary for obtaining the multiple view image data at the image decoder are transmitted along with the DCT coefficient data up to the degree required by the desired contraction data. As a result, no decoder or encoder is necessary for this image bridge 3, so that a size of the image bridge 3 can be kept small even when the large number of participants are to be involved, and a processing time at the image bridge 3 can be shortened compared with the conventional case involving the decoder and encoder.

It is noted that the bridge controller 26 need not have a very fast processing speed, so that it can be implemented by an ordinary micro-computer, while the other components excluding the memory 24 can be implemented by the LSI using C-MOS process.

It is also to be noted that a number of processing blocks can be larger than four as described above, and in principle unlimited, although in practice, a realistic number by which the display can be divided into subsections (about 16) will be a reasonable upper limit for the number of participants.

It is further to be noted that the input encoded by a standard encoding method such as H.261 can be adapted to this bridge circuit 10 by decoding such an input once beforehand, and then encoding this decoded input by using the image encoder of FIG. 3 according to the present invention.

Referring now to FIG. 11, the image decoder provided in each user terminal in the system of FIG. 2 will be described in detail.

This image decoder comprises: a symbol decoder 32 for receiving the input; a supplementary information memory 33 connected with the symbol decoder 32; an inverse quantizer 34 connected with the symbol decoder 32; an address controller 35 connected with the symbol decoder 32 and the supplementary information memory 33; a coefficient memory 36 connected with the inverse quantizer 34 and the address controller 35; an inverse DCT unit 37 connected with the coefficient memory 36; a display memory 38 connected with the inverse DCT unit 37; an address controller 39 connected with the display memory 38; a character generation unit 40; an adder 41 connected with the display memory 38 and the character generation unit 40; and a header analysis controller 31 which receives the input and controls each of the above elements.

Here, the input includes various cells such as the data cell, system cell, and decoder control cell, which are classified according to the information source and the attribute, and the header analysis controller 31 extracts the information necessary for controlling the other elements of the image decoder from these cells, including the quantization characteristic, supplementary information, DCT coefficient data, information source category, contraction rate, image position for the image data, plane information, superimposition information, and image position for the letter message data.

The symbol decoder 32 decodes the supplementary information, DCT coefficient data, and letter message data in the input data cells and system cells, according to the quantization characteristic extracted by the header analysis controller 31. The decoded supplementary information for each information source is then memorized in the supplementary information memory 33 provided in correspondence to the number of information sources, according to the information source category extracted by the header analysis controller 31. The decoded DCT coefficient data for each information source are inversely quantized at the inverse quantizer 34 to recover the unquantized DCT coefficient data, according to the quantization characteristic extracted by the header analysis controller 31, and the recovered DCT coefficient data are subsequently memorized in the coefficient memory 36 which is also provided in correspondence to the number of information sources. Here, the address in the coefficient memory 36 for writing the DCT coefficient data is controlled by the address controller 35 according to the supplementary information memorized in the supplementary information memory 33, decoded DCT coefficient data obtained by the symbol decoder 32, and the supplementary information, DCT coefficient data, and information source category extracted by the header analysis controller 31.

When all the DCT coefficient data for all the information sources are memorized in the coefficient memory 36, the memorized DCT coefficient data are read out from the addresses controlled by the address controller 35 according to the supplementary information memorized in the supplementary information memory 33, decoded DCT coefficient data obtained by the symbol decoder 32, and the supplementary information, DCT coefficient data, information source category, and the plane information extracted by the header analysis controller 31. Then, the inverse DCT of the degree corresponding to that required by the desired contraction rate extracted from the decoder control cell at the header analysis controller 31 is applied at the inverse DCT unit 37, so as to reproduce the contracted images.

The contracted images obtained by the inverse DCT unit 37 are then written into the display memory 38 in addresses determined by the address controller 39 according to the image position for the image data and the plane information extracted from the decoder control cell at the header analysis controller 31, so as to obtain the multiple view image data on the display memory 38. Here, the contracted images are written according to the order specified by the plane information such that the images on the upper plane are written later than the images on the lower plane, so that the images on the uppermost plane appears at forefront in the multiple view image to be displayed.

Then, the letter message data generated by the character generation unit 40 in accordance with the superimposition information extracted from the decoder control cell at the header analysis controller 31 are superimposed onto the multiple view image data obtained in the display memory 38 at the adder 41 according to the image position for the letter message data extracted from the decoder control cell at the header analysis controller 31, such that the multiple view image superimposed with the letter message can be displayed on a display device (not shown) at each user terminal.

Here, as shown in FIG. 12, the virtual display having the size corresponding to the display memory 38 is set larger than the actual display to be visible on the display unit. In a case of displaying nine views of this display, each view have to be contracted by $\frac{1}{3}$, but the obtainable contraction rate closest to $\frac{1}{3}$ is $\frac{3}{8}$ when the 8×8 DCT is used. In such a case, each view contracted by $\frac{3}{8}$ may be arranged in 3×3 square array in the virtual display region, with edge portions located outside the actual display regions, as shown in FIG. 12.

Figure 13:
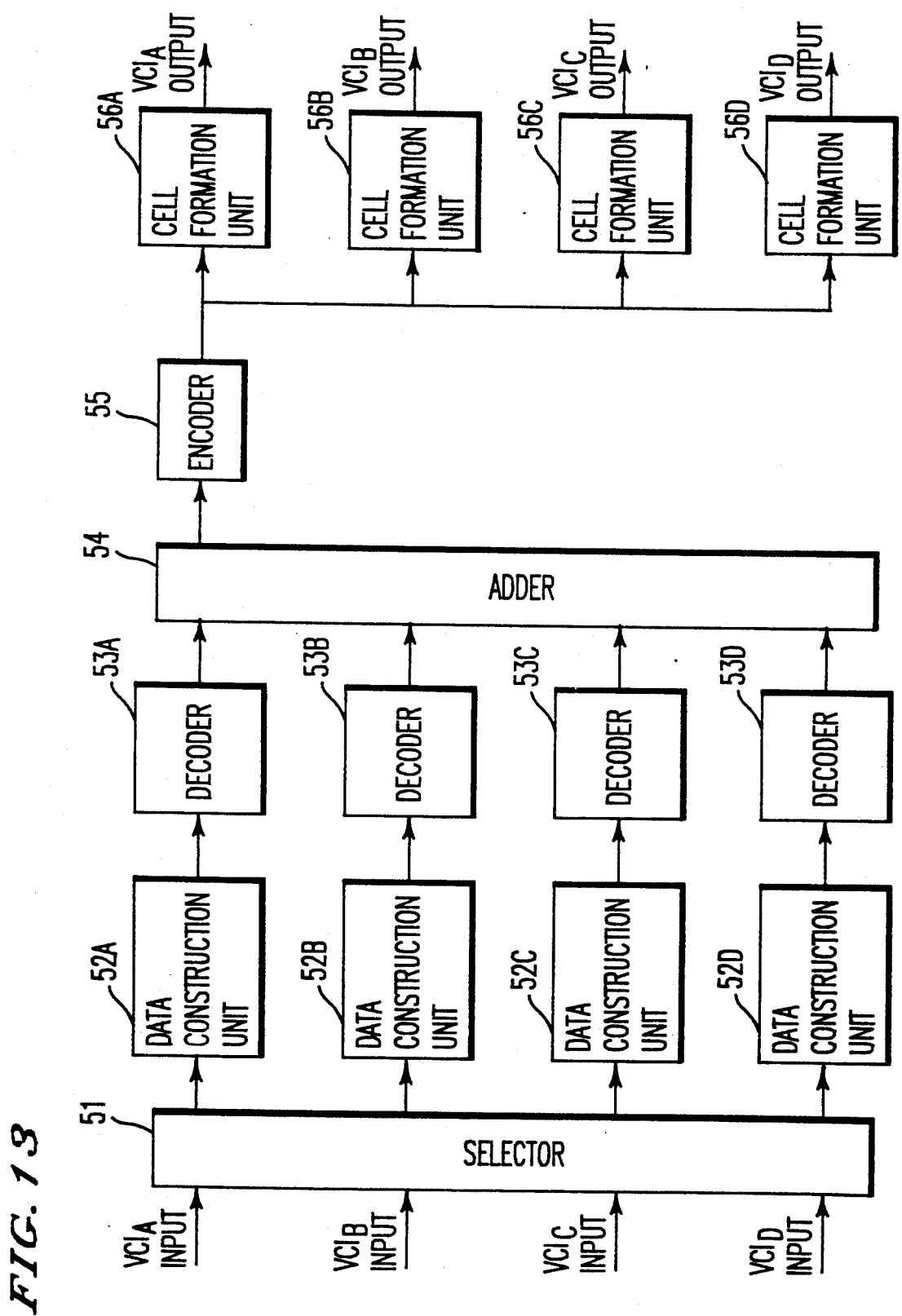
FIG. 13 is a detail block diagram of a sound bridge in the bridge circuit of the system of FIG. 2.

Referring now to FIG. 13, the sound bridge 4 provided in the bridge circuit 10 of FIG. 2 will be described in detail.

This sound bridge 4 functions to appropriately mix or distribute the sound cells transmitted through the ATM network 1 in a form suitable for a codec unit provided in each user terminal.

The sound signals at each user terminal are digitized by the μ-PCM codec and encoded, and then transmitted in a form of cells of FIG. 6 to the ATM network 1. Here, the encoding can be done by the 32 kbps embedded ADPCM (adaptive differential PCM) of the CCITT (Comité Consultatif Internationale Télégraphique et Téléphonique) draft recommendation G. EMB for which suffers less deterioration due to the cell loss in the ATM network, for example.

The sound bridge of FIG. 13 comprises: a selector 51 for receiving the input; data construction units 52A to 52D connected with the selector 51 which are provided in correspondence to the number of information sources; decoders 53A to 53D connected with the data construction units 52A to 52D which are also provided in correspondence to the number of information sources, an adder 54 connected with the decoders 53A to 53D; an encoder 55 connected with the adder 54; and cell formation units 56A to 56B connected with the encoder 55 which are also provided in correspondence to the number of information sources.

The selector 51 selects the inputs from the user terminals of the participants according to the VCI, and the sound data are constructed for each information source at the data construction units 52A to 52D. The decoders 53A to 53D then recovers the μ-PCM signals from the sound data encoded by the embedded ADPCM, and then transform them into the linear PCM signals. The adder 54 mixes the sound data from all the information sources by adding the linear PCM signals obtained by the decoders 53A to 53D. Then, the mixed sound data are re-encoded at the encoder 55 by transforming the linear PCM signals into the μ-PCM signals and then encoding the μ-PCM signals by the embedded ADPCM. The encoded sound data obtained by the encoder 55 are then put into a form of the cell of FIG. 6 by the cell formation units 56A to 56D and attached with VCI, and then transmitted to the ATM network 1.

Thus, in this sound bridge 4, the encoded sound data are decoded once for the purpose of mixing, and then reencoded. For this reason, the sound bridge 4 requires a plurality of decoders and at least one encoder. However, unlike the case of the image bridge 3, the decoders and encoders for the sound data are so small in size that the sound bridge 4 can be realized by a single DSP (digital signal processing) chip, and therefore the inclusion of the decoders and encoders does not cause any problem for the sound bridge 4.

Figure 14:
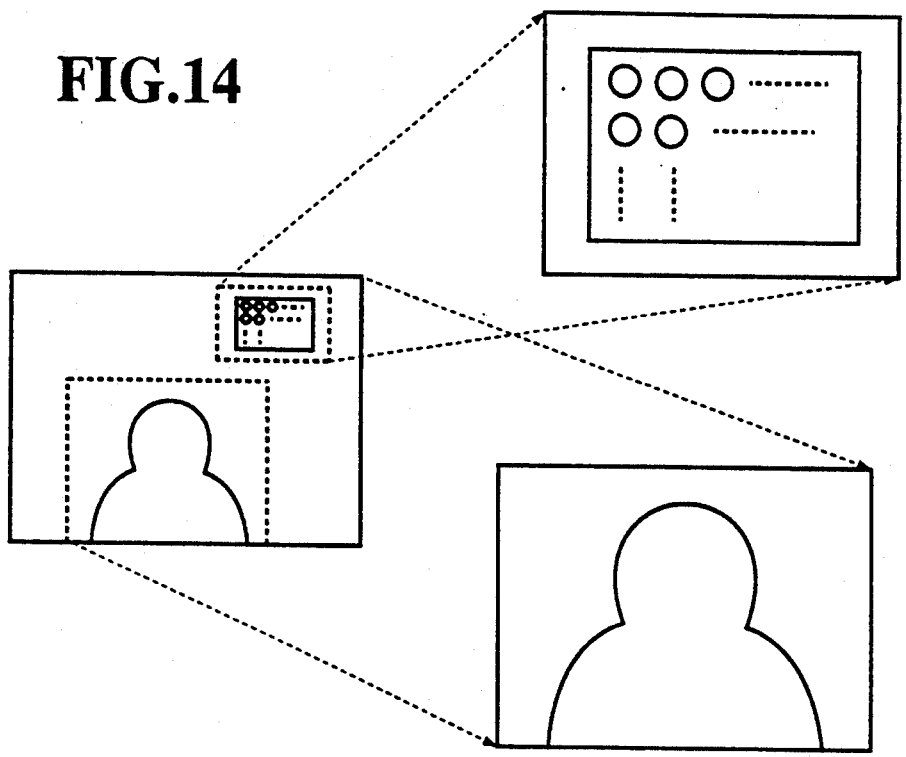
FIG. 14 is a diagram of a display in the system of FIG. 2 for explaining a case of expansion of image data.

Now, in the system for transmitting the encoded image data described above, the operation of the expansion of the image data can be handled in a manner similar to the case of contraction described above. Such an expansion of the image data will be necessary when the image portion or the letter portion in the multiple view image is to be enlarged as shown in FIG. 14.

Figure 15:
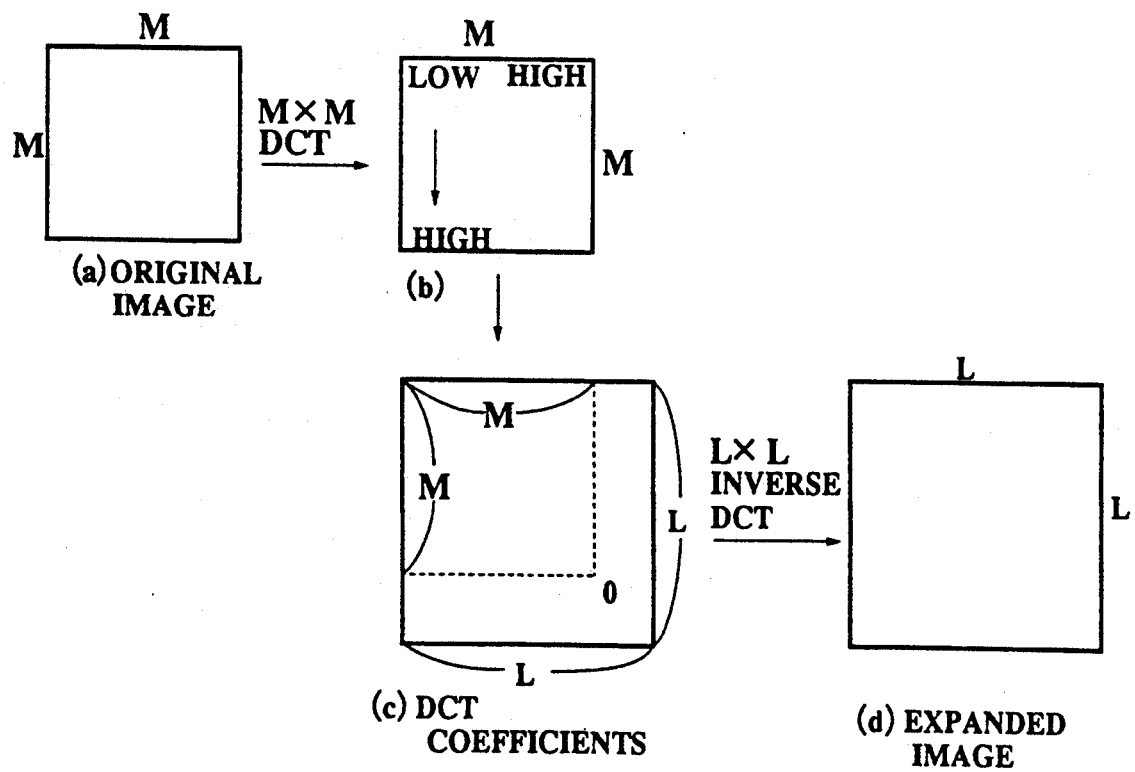
FIG. 15 is a schematic diagram for explaining the operation of expansion to be carried out in the system of FIG. 2.

This expansion can be achieved as shown schematically in FIG. 15. Namely, the original image (a) of FIG. 15 is transformed into the M×M DCT coefficient data (b) of FIG. 15 by M×M DCT at the image encoder of FIG. 3. Then, the expansion of M×M DCT coefficient data to the expanded DCT coefficient data (c) of FIG. 15 in a form of L×L block (L>M) is achieved by determining the portions to be expanded and the expansion rate at the image bridge, and then carrying out L×L inverse DCT at the image decoder using the L×L transform coefficient blocks in which 0 are inserted for the frequency components higher than M×M, so as to obtain the expanded image (d) of FIG. 15.

This expansion operation can be achieved in the same manner as in the case of the contraction described above, except that the expansion rate should be used instead of the contraction data. Furthermore, in a case the entire image data are transmitted to the image decoder but only a portion of the image is to be expanded as shown in FIG. 14, additional cut out information for indicating the portion to be cut out should be provided after the plane information in the decoder control cell of FIG. 9.

Figure 16:
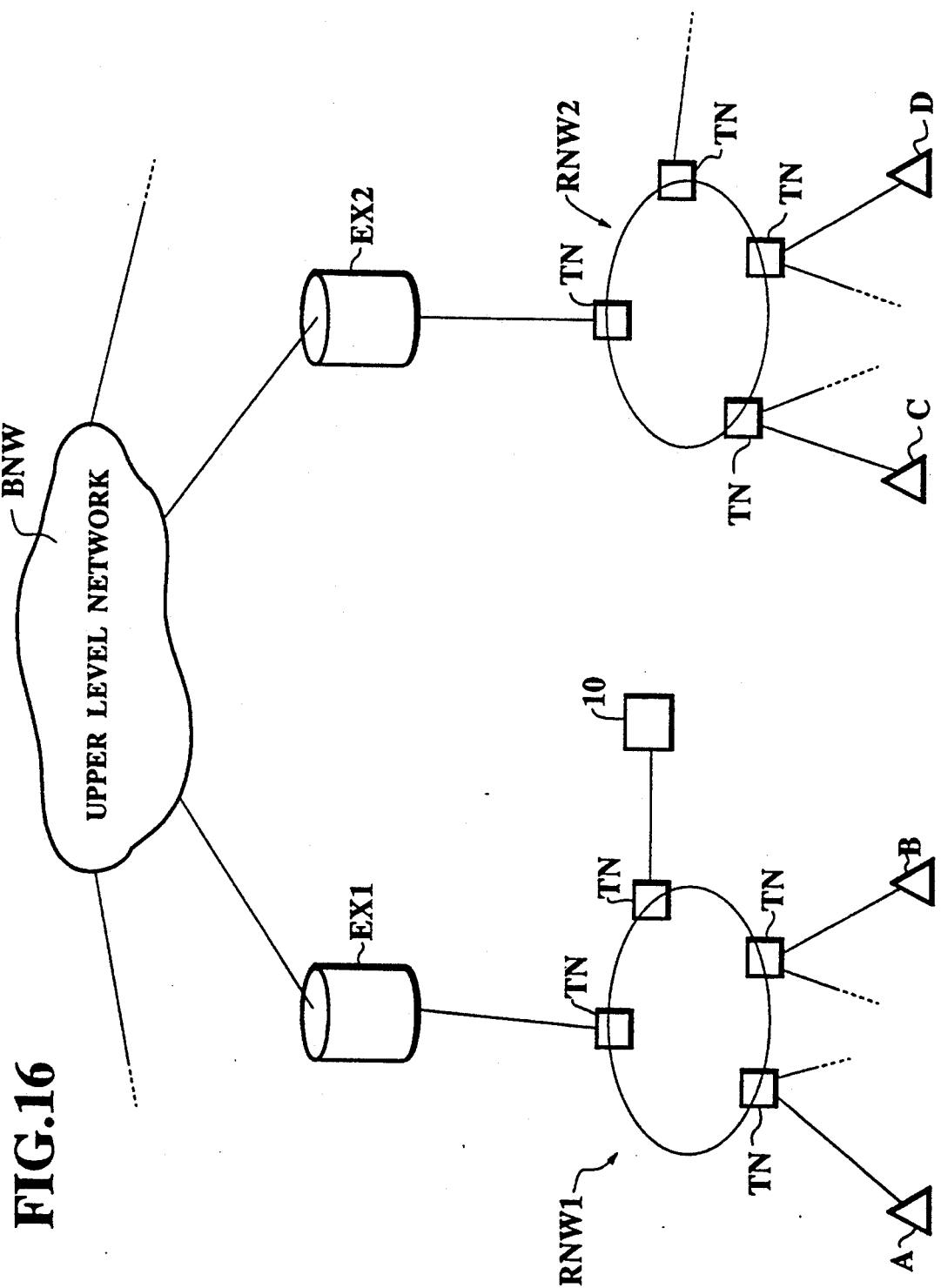
FIG. 16 is a schematic diagram of an ATM network for a TV conference system using the system of FIG. 2.

In a case of applying the system for transmitting encoded image data according to the present invention described above to a TV conference system, the ATM network can be formed as shown in FIG. 16.

Namely, there is provided a number of access nodes EX1, EX2, ... which are mutually connected through an upper level network BNW. Each access node has an intermediate access network RNW1, RNW2, ... each of which has a form of a distributed ring network structure equipped with a plurality of terminal nodes TN. Each user terminal provided for each of the conference participants is connected to one terminal node TN of the intermediate access networks RNW1, RNW2, ..., while the bridge circuit 10 is connected to one terminal node TN of one intermediate access network RNW. With this configuration, the user terminals and the bridge circuit can communicate directly through the ATM network, so that the communication between the user terminals and the bridge circuit can be achieved without relying on the control of the ATM network, and therefore the control protocol for the ATM network can be simplified and the reliability of the system can be improved.

It is to be noted that the above described embodiment may be modified such that instead of transmitting only the DCT coefficient data up to the degree required by the desired contraction rate from the image bridge 3, the entire DCT coefficient data may be transmitted in a case the cost and the transmission efficiency are not so critically important.

Also, the information source and the attribute may be attached to the cell header of every cell to be transmitted. In this case, the transmission efficiency will be lowered, but the data construction in the processing block of the image bridge will be unnecessary so that the configuration of the image bridge can be further simplified.

Now a detail of the contraction of the image data described above with reference to FIG. 7 and the expansion of the image data described above with reference to FIGS. 14 and 15 will be described.

Namely, according to the present invention, instead of carrying out the transformation by the change of the sampling frequency in a unit of each image as a whole as in the conventional method, the transformation is carried out in a unit of each block by converting the degree of the transformation.

This will be described more specifically with reference to the diagrams of FIGS. 17(A) to 17(C).

Figure 17:
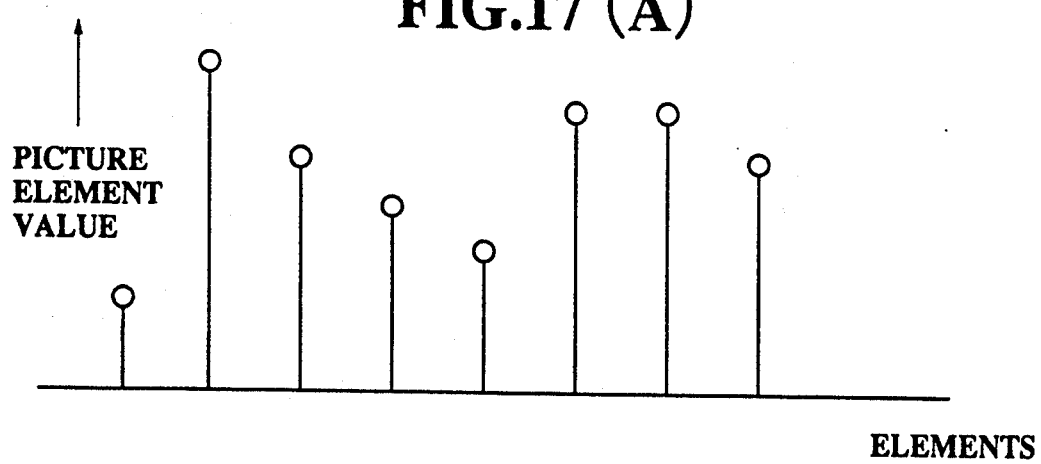
FIGS. 17(A) to 17(C) are diagrams for explaining operations of expanding or contracting image data according to the present invention.
Figure 17:
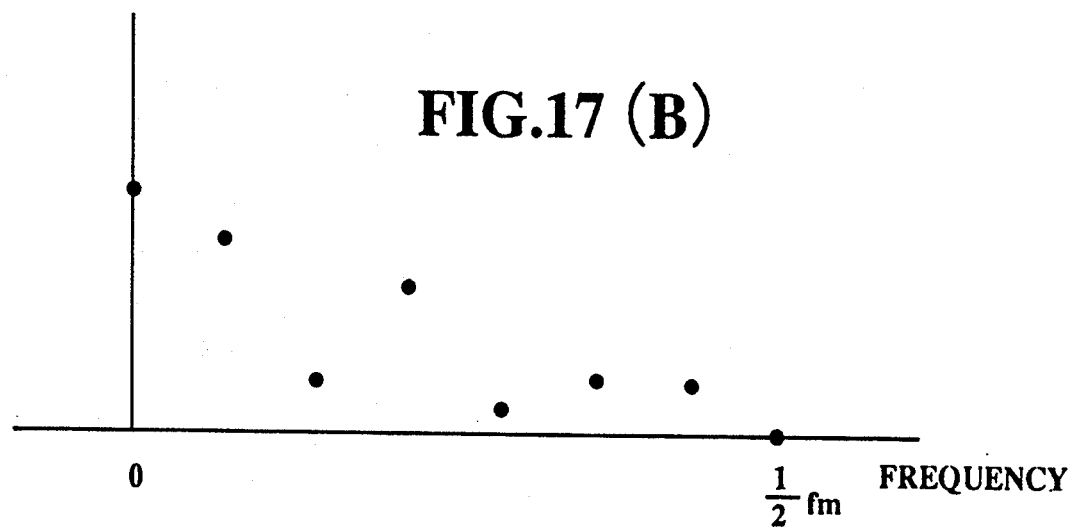
Figure 17:
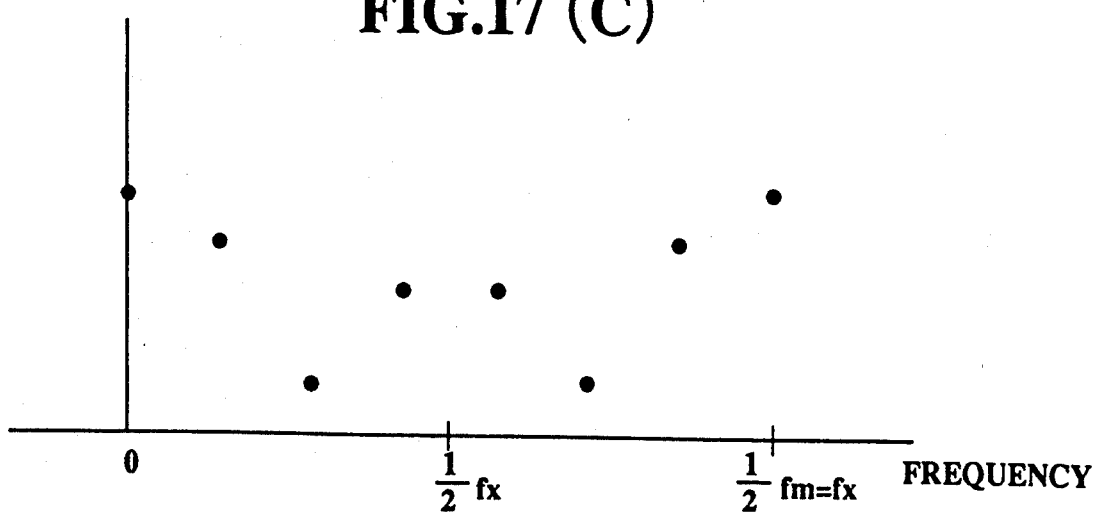

FIG. 17(A) shows a picture element value distribution in a block containing 1×8 picture elements. When an orthogonal transform such as DFT (discrete Fourier transform) is applied to this block, the transform coefficients shown in FIG. 15(B) can be obtained.

In order to contract this block by ½, the sampling frequency fm have to be changed to a smaller frequency fx= (½)fm. Here, the contracted form of the transform coefficients shown in FIG. 17(C) can be obtained by putting the components higher than (½)fx in FIG. 17(B) to be equal to 0.

In terms of the transform matrices, this operation can be described as follows. Here, the description is given by using the DCT as an orthogonal transform, although the other orthogonal transform such as DST(discrete sine transform), DFT(discrete Fourier transform), and WAT (Walsh Hardamart transform) may be used for the orthogonal transform.

Namely, an element of the transform matrix for an N-th degree normal DCT can be expressed by the following expression:

$$d_{ij} = \frac{P(i)}{\sqrt{n}} \cos\left(\frac{\pi}{N}(i-1)\left(j-\frac{1}{2}\right)\right)$$

where i=1, ..., N, j=1, ..., N, and $$P(i) = \begin{cases} \sqrt{2} & \text{when } i = 1 \\ 1 & \text{when } i \neq 1 \end{cases}$$

Now, expressing a continuous picture element value before sampling as x(t), and the sampled picture element values in each block as $X_1, X_2, \ldots, X_N$, the transform coefficients $Y(0), Y(1), \ldots, Y(N-1)$ can be given by the following expression:

$$Y(k) = \frac{P(k+1)}{\sqrt{N}} \sum_{n=1}^{N} x\left(n - \frac{1}{2}\right) \cos\left(\frac{\pi}{N} k \left(n - \frac{1}{2}\right)\right)$$

where $k = 0, 1, \ldots, N-1$.

Figure 18:
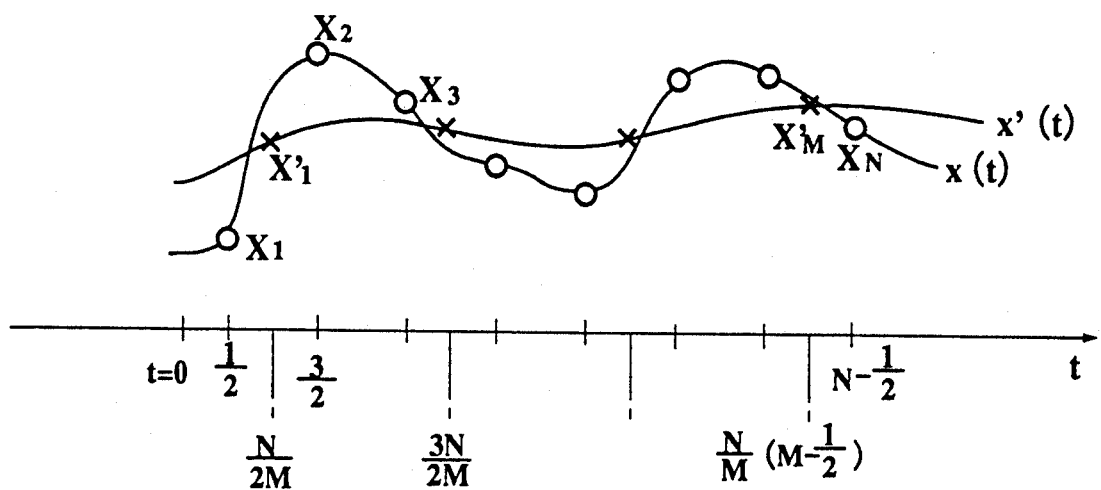
FIG. 18 is a diagram showing sampling timings in the operations of expanding or contracting image data according to the present invention.

Here, the frequency of Y(k) is k/2N, and the original sampling frequency for $X_1, X_2, \ldots, X_N$ is assumed to be 1 as shown in FIG. 18.

Now, in order to reduce the number of picture elements from N to M, the high frequency components $Y(N-1), \ldots, Y(M+1), Y(M)$ are put equal to 0. Then, with the sampling frequency equal to M/N, the picture elements $X'_1, \ldots, X'_M$ can be given by the following expression:

$$X'_m = x'\left(\frac{N}{M}\left(m - \frac{1}{2}\right)\right)$$

$$= \sum_{k=0}^{M-1} Y(k) \cos\left(\frac{\pi}{N} k \left(\frac{N}{M}\left(m - \frac{1}{2}\right)\right)\right) \cdot \frac{P(k+1)}{\sqrt{N}}$$

$$= \sum_{k=0}^{M-1} Y(k) \cos\left(\frac{\pi}{M} k \left(m - \frac{1}{2}\right)\right) \frac{P(k+1)}{\sqrt{N}}$$

where $m = 1, \ldots, M$.

Thus, $X'_1, \ldots, X'_M$ can be obtained by inversely transforming the transform coefficients for $k = 0, \ldots, M-1$ by using the transform matrix of the following form:

$$d'_{ij} = \frac{P(i)}{\sqrt{N}} \cos\left(\frac{\pi}{M}(i-1)\left(j - \frac{1}{2}\right)\right)$$

where $i = 1, \ldots, M, j = 1, \ldots, M$.

Here, $d'_{ij}$ is a matrix obtained by multiplying the M-th degree normal DCT with $\sqrt{M/N}$, so that it can be regarded as an orthogonal transform. In other words, the above described contraction operation by the filtering to cut off the high frequency component and the lowering of the sampling frequency can be regarded as equivalent to the inverse transform using the lower degree orthogonal transform.

It is noted that in the above described contraction operation, the contraction rate can take only a discrete value of $1/N, 2/N, \ldots, (N-1)/N$.

The case of expansion can be dealt with in the similar manner as follows.

In this case, putting M > N, the picture element $X'_m$ can be given by:

$$X'_m = \sum_{k=0}^{M-1} Y(k) \cos\left(\frac{\pi}{M} k \left(m - \frac{1}{2}\right)\right) \frac{P(k+1)}{\sqrt{N}}$$

where $m = 1, \ldots, M$.

Putting $Y(N), \ldots, Y(M-1)$ equal to 0 in this expression, this expansion operation can also be regarded as equivalent to the inverse transform using the lower degree orthogonal transform using the transform matrix obtained by multiplying the M-th degree normal DCT with $\sqrt{M/N}$, just as in the case of contraction.

Now, one embodiment of an apparatus for contracting encoded image data according to the present invention, which operates according to the principle described above, will be described in detail.

First, an apparatus for encoding the image data will be described with reference to FIG. 19.

This apparatus for encoding image data of FIG. 19 comprises: a block dividing unit 120 for receiving the image input; an orthogonal transform unit 121 connected with the block dividing unit 120; a quantizer 122 connected with the orthogonal transform unit 120; and an encoder 123 connected with the quantizer 122 which outputs the encoded image output.

The block dividing unit 120 divides the input image into a number of rectangular blocks of N×M size each, where N may be equal to M. In the following, the description will be given for a case of N=M=8.

The orthogonal transform unit 121 applies the orthogonal transform to each of the divided block obtained by the block dividing unit 120 to obtain the N×M transform coefficient matrix for each block. Here, the orthogonal transform can be normal DCT for example. An example of a transform matrix for the eighth degree normal DCT is shown in FIG. 20. Also, an example of a calculation for the 8-th degree normal DCT using the transform matrix of FIG. 20 is shown in FIG. 21.

The transform coefficient matrix obtained by the orthogonal transform unit 121 is then quantized by the quantizer 122, and encoded by the encoder 123, to obtain the encoded image data.

Here, the quantization can be done by a linear quantization with the step size 16, or by a nonlinear quantization with the max step size, while the encoding can be done by Huffmann encoding or by an arithmetic encoding.

Next, referring to FIG. 22, the apparatus for contracting encoded image data in this embodiment will be described in detail.

This apparatus for contracting encoded image data comprises: a decoder 110 for receiving encoded image input; an inverse quantizer 111 connected with the decoder 110; a contraction rate determining unit 116; a transform coefficient matrix contraction unit 112 connected with the inverse quantizer 111 and the contraction rate determining unit 116; a transform matrix memory 115 connected with the contraction rate determining unit 116; an inverse orthogonal transform unit 113 connected with the transform coefficient matrix contraction unit 112 and the transform matrix memory 115; and a block combining unit 114 connected with the inverse orthogonal transform unit 113 which outputs the reproduced image output.

In this apparatus, the encoded image data for each block are decoded by the decoder 110, and the N×M transform coefficient matrix is recovered by inversely quantizing the decoded image data at the inverse quantizer 111. Then, according to the contraction rate determined in advance by the contraction rate determining unit 116, the N×M transform coefficient matrix obtained by the inverse quantizer 111 is contracted to i×j contracted transform coefficient matrix at the transform coefficient matrix contraction unit 112, where i=1, 2, . . . , N and j=1, 2, . . . , M and the contraction rate can take a discrete value of 1/N, 2/N, . . . , N/N for the longitudinal direction and 1/M, 2/M, . . . , M/M for the transverse direction.

Now, the transform matrix memory 115 memorizes the transform matrices of all degrees from the first degree to the N-th degree or the M-th degree prepared in advance. In a case of N=M=8 using the normal DCT, the eight transform matrices $T_1$ to $T_8$ shown in FIG. 23 will be memorized in the transform matrix memory 115. Here, the transform matrices $T_1$ to $T_8$ are obtained by multiplying the first to eighth degree normal DCT matrices with $\sqrt{1/8}$, $\sqrt{2/8}$, . . . , $\sqrt{8/8}$, respectively.

In usual context, the orthogonal transform matrix is defined to have a determinant equal to 1 and the norm of each base vector equal to 1, but here and in the following description, a concept of the orthogonal transform matrix is extended to includes the transform using the transform matrices which are the regular matrices obtained by multiplying the orthogonal matrices themselves or their base vectors with a constant number.

Next, the i-th degree transform matrix $T_i$ and the j-th degree transform matrix $T_j$ are read out from the transform matrix memory 115, and the inverse orthogonal transform using these transform matrices are applied by the inverse orthogonal transform unit 113 to the i×j contracted transform coefficient matrix obtained by the transform coefficient matrix contraction unit 112 in order to obtain the i×j block. An example of this calculation at the inverse orthogonal transform unit 113 is shown in FIG. 24 for a case i=j=3.

The i×j contracted block obtained by the inverse orthogonal transform unit 113 is then supplied to the block combining unit 114 at which all the contracted blocks obtained from the blocks of a single image are combined together in order to obtain the reproduced image which is subsequently outputted. Here, the reproduced image is contracted by i/N in the longitudinal direction and j/M in the transverse direction compared with the input image.

In this embodiment of FIG. 22, when only a single predetermined contraction rate is to be used, the transform matrix of a degree corresponding to this predetermined contraction rate may be memorized in the transform matrix memory 115. In this case, the transform coefficient matrix can be obtained or transmitted only up to the degree required by the inverse orthogonal transform corresponding to this predetermined contraction rate.

Figure 25:
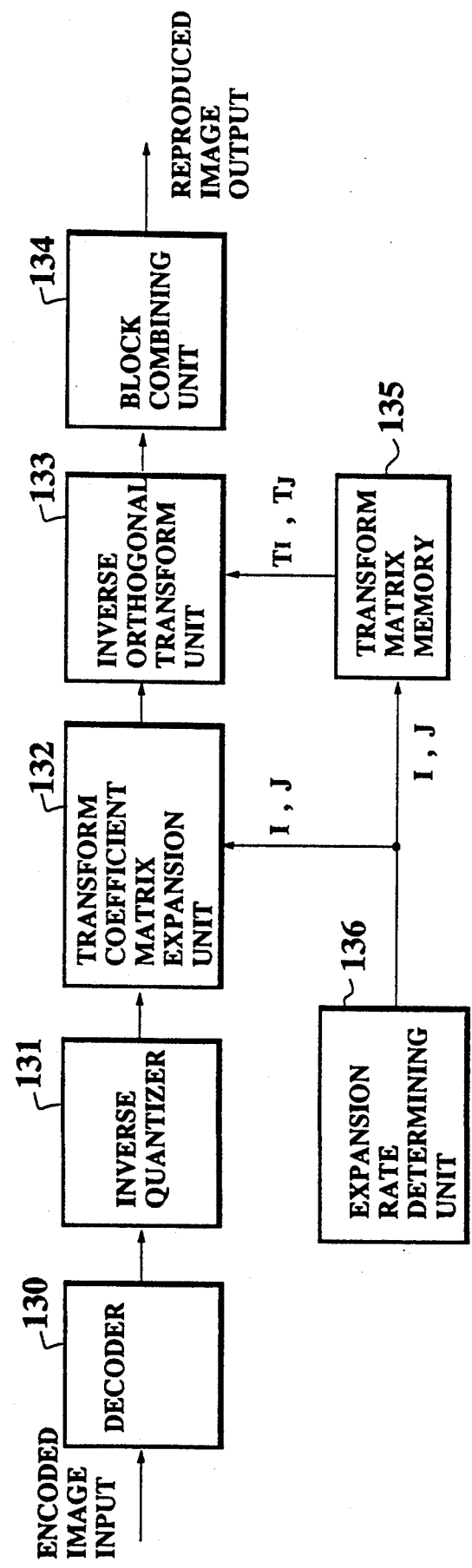
FIG. 25 is a block diagram of one embodiment of an apparatus for expanding encoded image data according to the present invention.

Referring now to FIG. 25, one embodiment of an apparatus for expanding encoded image data according to the present invention will be described in detail. Here, the encoding of the image data can be carried out by the apparatus for encoding image data of FIG. 19 described above.

This apparatus for expanding encoded image data comprises: a decoder 130 for receiving encoded image input; an inverse quantizer 131 connected with the decoder 130; an expansion rate determining unit 136; a transform coefficient matrix expansion unit 132 connected with the inverse quantizer 131 and the expansion rate determining unit 136; a transform matrix memory 135 connected with the expansion rate determining unit 136; an inverse orthogonal transform unit 133 connected with the transform coefficient matrix expansion unit 132 and the transform matrix memory 135; and a block combining unit 134 connected with the inverse orthogonal transform unit 133 which outputs the reproduced image output.

In this apparatus, the encoded image data for each block are decoded by the decoder 130, and the N×M transform coefficient matrix is recovered by inversely quantizing the decoded image data at the inverse quantizer 131. Then, according to the expansion rate determined in advance by the contraction rate determining unit 136, the N×M transform coefficient matrix obtained by the inverse quantizer 131 is expanded to I×J expanded transform coefficient matrix at the transform coefficient matrix expansion unit 132 by using the original N×M transform coefficient matrix as upper left N×M components of the I×J expanded transform coefficient matrix, and setting all the remaining higher components to 0. Here, the expansion rate can take a discrete value of N+1/N, N+2/N, . . . for the longitudinal direction and M+1/M, M+2/M, . . . for the transverse direction. In the following, the description will be given for an exemplary case of using two expansion rates of 10/8 and 16/8 for both the longitudinal and transverse directions.

Now, the transform matrix memory 135 memorizes the transform matrices of the degrees corresponding to the expansion rates to be used. For the expansion rates of 10/8 and 16/8, the two transform matrices $T_{10}$ and $T_{16}$ shown in FIG. 26 will be memorized in the transform matrix memory 135. Here, the transform matrices $T_{10}$ and $T_{16}$ are obtained by multiplying the tenth and sixteenth degree normal DCT matrices with $\sqrt{10/8}$ and $\sqrt{16/8}$, respectively.

Next, the I-th degree transform matrix $T_I$ and the J-th degree transform matrix $T_J$ are read out from the transform matrix memory 135, and the inverse orthogonal transform using these transform matrices are applied by the inverse orthogonal transform unit 133 to the I×J expanded transform coefficient matrix obtained by the transform coefficient matrix expansion unit 132 in order to obtain the I×J block. An example of this calculation at the inverse orthogonal transform unit 133 is shown in FIG. 27 for a case I=J=10.

The I×J expanded block obtained by the inverse orthogonal transform unit 133 is then supplied to the block combining unit 134 at which all the expanded blocks obtained from the blocks of a single image are combined together in order to obtain the reproduced image which is subsequently outputted. Here, the reproduced image is expanded by I/N in the longitudinal direction and J/M in the transverse direction compared with the input image.

Figure 28:
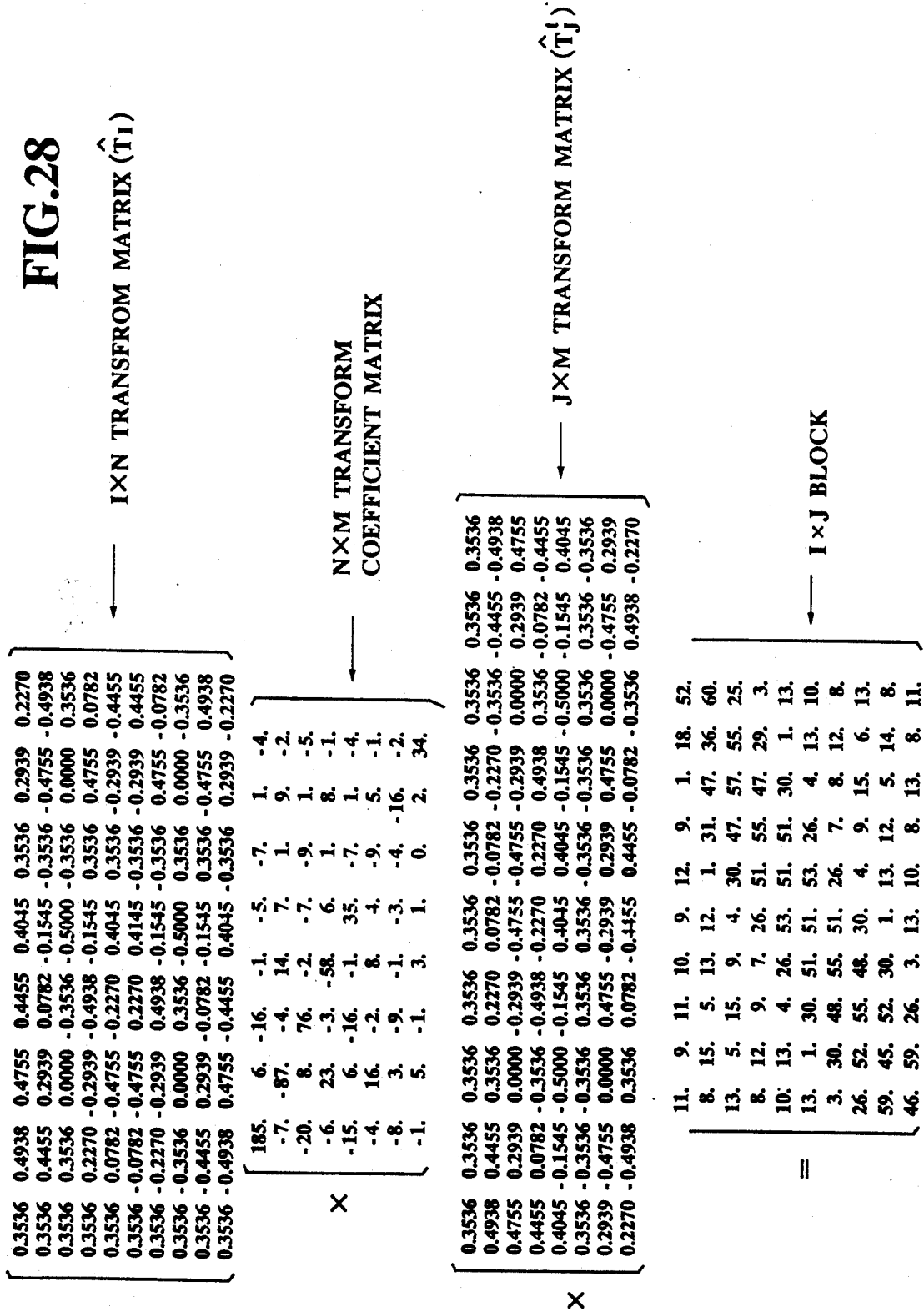
FIG. 28 is an illustration of another example of a calculation for the inverse orthogonal transform used in the apparatus of FIG. 25.

In this embodiment of FIG. 25, the transform matrices are not necessarily be the square matrices of the I-th and the J-th as described above. This is because the transform coefficient matrix originally is N×M so that the N+1 to I-th base vectors and M+1 to J-th base vectors are not at all used in the calculation of the inverse orthogonal transform. For this reason, the I×N and J×M transform matrices may be used instead. An example of the calculation of the inverse orthogonal transform at the inverse orthogonal transform unit 133 using I×N transform matrix $T_I$ and a transpose of J×M transform matrix $T_j'$ is shown in FIG. 28 for a case I=J=10 and N=M=8, which corresponds to the same case shown in FIG. 27. In such a case, there is no need to expand the transform coefficient matrix obtained by the inverse quantizer 131, so that the transform coefficient matrix expansion unit 132 may be omitted.

It is also to be noted that in expanding the N×M transform coefficient matrix obtained by the inverse quantizer 131 to I×J expanded transform coefficient matrix at the transform coefficient matrix expansion unit 132 by using the original N×M transform coefficient matrix as upper left N×M components of the I×J expanded transform coefficient matrix, the remaining higher components may be set equal to a prescribed value other than 0, although 0 simplifies the calculation most effectively and therefore preferred most.

Figure 29:
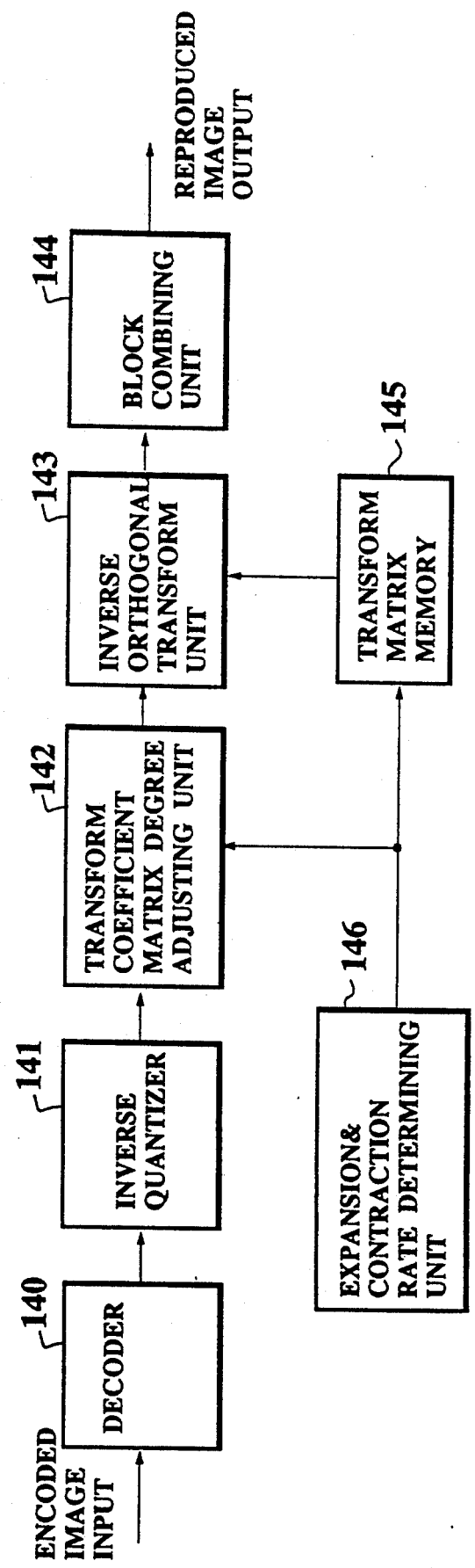
FIG. 29 is a block diagram of one embodiment of an apparatus for expanding and contracting encoded image data according to the present invention.

Referring now to FIG. 29, one embodiment of an apparatus for contracting and expanding encoded image data according to the present invention will be described in detail. Here, the encoding of the image data can be carried out by the apparatus for encoding image data of FIG. 19 described above.

This apparatus for contracting and expanding encoded image data is a combination of the apparatus of FIG. 22 and the apparatus of FIG. 25 described above, and comprises: a decoder 140 which is equivalent to the decoders 110 and 130; an inverse quantizer 141 which is equivalent to the inverse quantizers 111 and 131; an expansion and contraction rate determining unit 146 which has the functions of both the contraction rate determining unit 116 and the expansion rate determining unit 136; a transform coefficient matrix degree adjusting unit 142 which has the functions of both the transform coefficient matrix contraction unit 112 and the transform coefficient matrix expansion unit 132; a transform matrix memory 145 which has functions of both the transform matrix memories 115 and 135; an inverse orthogonal transform unit 143 which has functions of both the inverse orthogonal transform units 113 and 133; and a block combining unit 144 which is equivalent to the block combining units 114 and 134.

Thus, in this apparatus of FIG. 29, according to the expansion or contraction rate determined in advance by the expansion and contraction rate determining unit 146, the degree of the N×M transform coefficient matrix obtained by the inverse quantizer 141 is adjusted at the transform coefficient matrix degree adjusting unit 142, and the inverse orthogonal transform using the transform matrices of appropriate degrees memorized in the transform matrix memory 145 are applied by the inverse quantizer 143 to the adjusted transform coefficient matrix obtained by the transform coefficient matrix degree adjusting unit 142 in order to obtain the expanded or contracted block.

Figure 30:
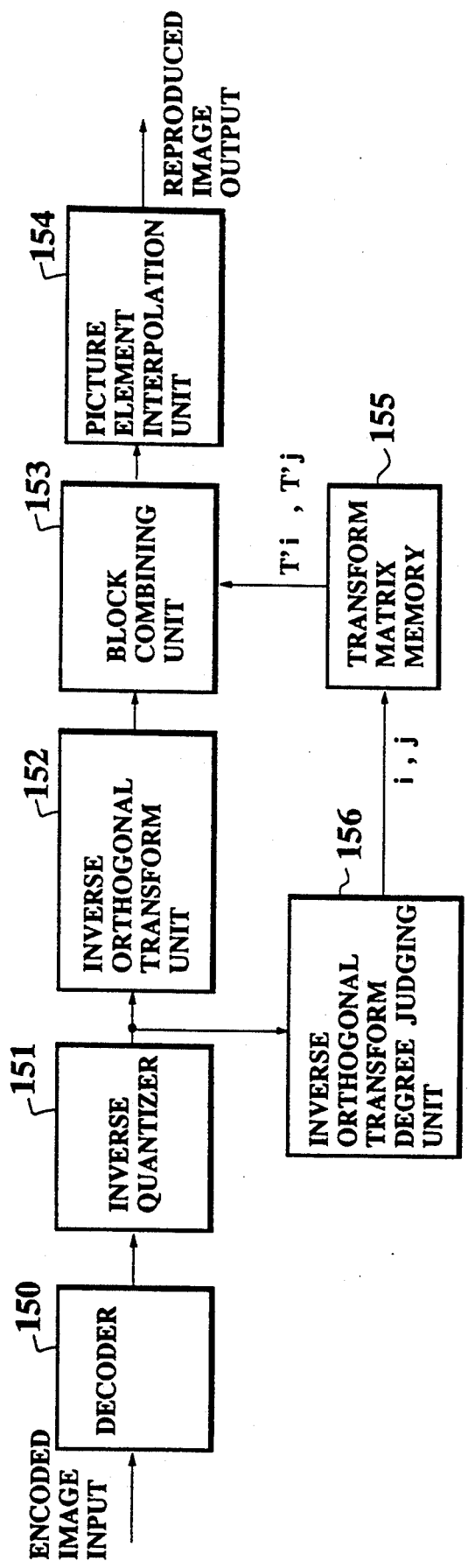
FIG. 30 is a block diagram of one embodiment of an apparatus for decoding encoded image data according to the present invention.

Referring now to FIG. 30, one embodiment of an apparatus for decoding encoded image data according to the present invention will be described in detail. Here, the encoding of the image data can be carried out by the apparatus for encoding image data of FIG. 19 described above.

This apparatus for decoding encoded image data comprises: a decoder 150 for receiving encoded image input; an inverse quantizer 151 connected with the decoder 150; an inverse orthogonal transform degree judging unit 156 connected with the inverse quantizer 151; a transform matrix memory 155 connected with the inverse orthogonal transform degree judging unit 156; an inverse othogonal transform unit 152 connected with the inverse quantizer 151 and the transform matrix memory 155; a block combining unit 153 connected with the inverse orthogonal transform unit 152; and a picture element interpolation unit 154 connected with the block combining unit 153 which outputs the reproduced image output.

In this apparatus, the encoded image data for each block are decoded by the decoder 150, and the N×M transform coefficient matrix is recovered by inversely quantizing the decoded image data at the inverse quantizer 151.

Now, the transform coefficient matrix obtained by the inverse quantizer 151 often includes a number of coefficients equal to 0 for the high components. Accordingly, the inverse orthogonal transform degree judging unit 156 determines the reduced degrees i and j obtained by eliminating the rows and columns consisting of 0 coefficients for the components higher than the highest non-zero coefficient from the N×M transform coefficient matrix obtained by the inverse quantizer 151.

Namely, in a case of N=M=8 shown in FIG. 31, there is one row (eighth row) and one column (eighth column) which consist of 0 coefficients for the components higher than the highest non-zero coefficient from the N×M transform coefficient. The sixth column also consist of 0 coefficients but the seventh column has a non-zero coefficient, so that this sixth column is not to be eliminated. Thus, in this case, i=j=7 is sufficient for the degree of the transform matrix.

Accordingly, next, the N-th degree transform matrix $T'_i$ which is effectively i-th degree by having arbitrary values for i+1 to N-th components and the M-th degree transform matrix $T'_j$ which is effectively j-th degree by having arbitrary values for j+1 to M-th components are read out from the transform matrix memory 155, and the inverse orthogonal transform using these transform matrices are applied by the inverse orthogonal transform unit 152 to the N×M transform coefficient matrix obtained by the inverse quantizer 151 in order to obtain the adjusted N×M block which is effectively i×j block by having zeros for the i+1 to N-th components and j+1 to M-th components. An example of this calculation at the inverse orthogonal transform unit 152 is shown in FIG. 32 for a case of N=M=8 and i=j=7.

In this embodiment, the transform matrices memorized in the transform matrix memory can be eight transform matrices $T_1$ to $T_8$ shown in FIG. 23.

Also, instead of using the effectively i-th and j-th transform matrices, the transform coefficient matrix may be contracted to i×j and the inverse orthogonal transform may be carried out by using i-th and j-th transform matrices as in the apparatus of FIG. 22 described above.

The adjusted block obtained by the inverse orthogonal transform unit 152 is then supplied to the block combining unit 154 at which all the adjusted blocks obtained from the blocks of a single image are combined together.

Figure 33:
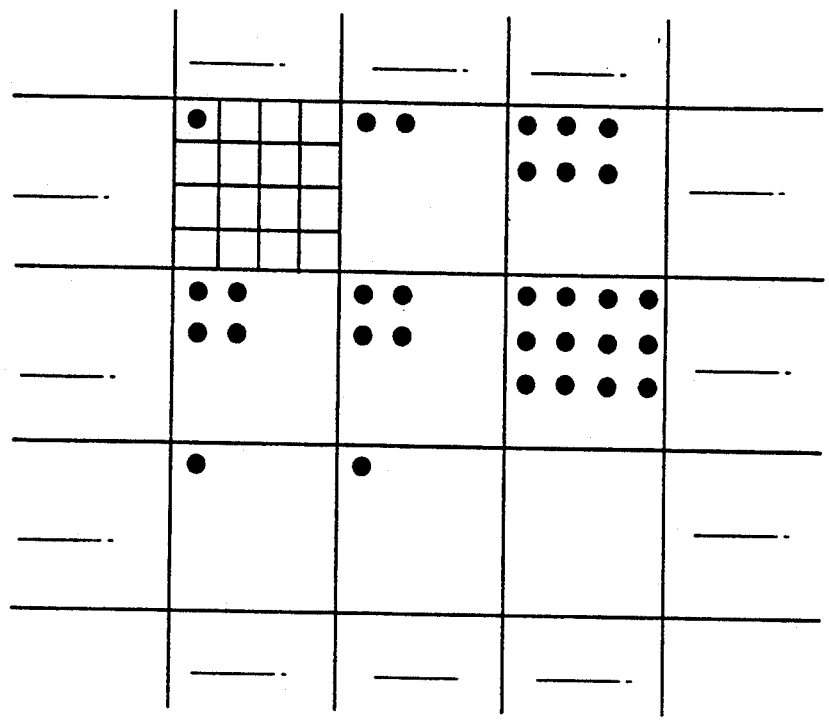
FIGS. 33(A) and 33(B) are illustrations of images reproduced by the apparatus of FIG. 30 for explaining the picture element interpolation to be carried out.
Figure 33:
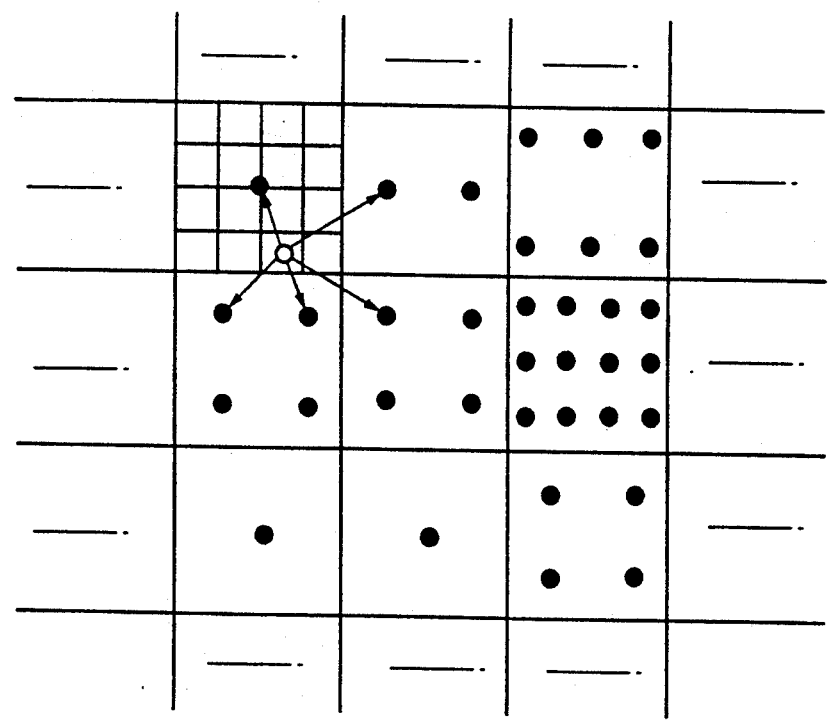

Here, the image obtained by combining the adjusted blocks appears as shown in FIG. 33(A) in which the black dots represent the i×j picture elements obtained by the inverse orthogonal transform.

The other picture elements not obtained by the inverse orthogonal transform are then obtained by interpolating among the picture elements obtained by the inverse orthogonal transform at the picture element interpolating unit 154, as shown in FIG. 33(B), in order to obtain the reproduced image which is subsequently outputted.

Here, in FIG. 33(B), the black dots in FIG. 33(A) are uniformly distributed within each block and then the interpolation of each picture element is carried out by using distances from each picture element to the nearest neighbor black dots.

In this embodiment, by carrying out the inverse orthogonal transform at the reduced degree and then interpolating the picture elements afterwards, the block distortion, mosquito noise, and ringing noise associated with the orthogonal transform encoding in general can be reduced.

It is to be noted that the size of the blocks used in this embodiment may be different from block to block.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A system for transmitting encoded image data through an ATM network, comprising:
   image encoder means, provided in each of a plurality of user terminals of the ATM network, for encoding orthogonal transform coefficient data obtained by applying an orthogonal transform to image data, and transmitting encoded image data in which the encoded orthogonal transform coefficient data are classified according to their degrees, through the ATM network;
   image processing means for receiving the encoded image data from the image encoder means, and transmitting processed image data containing the encoded orthogonal transform coefficient data in the encoded image data along with a size change rate information indicating a size change rate by which a size of the image data are to be changed, through the ATM network; and
   image decoder means, provided in each of a plurality of user terminals of the ATM network, for receiving the processed image data from the image processing means, and decoding the encoded orthogonal transform coefficient data in the processed image data into a degree corresponding to the size change rate indicated by the size change rate information in the processed image data by applying an inverse orthogonal transform of said degree to the encoded orthogonal transform coefficient data.

2. The system of claim 1, wherein the processed image data contains the encoded orthogonal transform coefficient data in the encoded image data up to a degree corresponding to the size change rate indicated by the contraction rate information.

3. The system of claim 1, wherein the processed image data also contains image position information indicating a position on a display at which an image given by the image data are to be placed.

4. The system of claim 3, wherein the processed image data specifies multiple view image in which a plurality of image data from a plurality of user terminals in the ATM network, each of which has its size changed by the size change rate indicated by the size change rate information and placed at the position indicated by the image position information, are combined together to form a single image.

5. The system of claim 4, wherein the encoded image data and the processed image data are transmitted in a form of a cell.

6. The system of claim 1, wherein the size change rate indicated by the size change rate information in the processed image data is a contraction rate.

7. The system of claim 1, wherein the size change rate indicated by the size change rate information in the processed image data is an expansion rate.

8. The system of claim 1, wherein the image encoder means encodes the image data by using an orthogonal transform of a given degree, and the image decoder means decodes the encoded orthogonal transform coefficient data by applying inverse orthogonal transform to orthogonal transform coefficient matrix for the encoded image data by using the transform matrices having degrees different from said given degree, to obtain decoded image data.

9. The system of claim 8, wherein said given degree is greater than the degrees of the transform matrices such that the encoded image data are contracted to the decoded image data.

10. The system of claim 9, wherein the image decoder means also changes the degree of the orthogonal transform coefficient matrix for the encoded image data from said given degree to the degrees of the transform matrices before applying the inverse orthogonal transform.

11. The system of claim 10, wherein the image decoder means retains lower components of the orthogonal transform coefficient matrix up to the degrees of the transform matrices while discarding high components of the orthogonal transform coefficient matrix higher than the degrees of the transform matrices in changing the degree of the orthogonal transform coefficient matrix for the encoded image data.

12. The system of claim 9, wherein the orthogonal transform coefficient matrix for the encoded image data includes a number of rows and columns from a highest component side which consists entirely of 0 elements, and the image decoder means changes the degree of the orthogonal transform coefficient matrix from said given degree to degrees equal to said number of rows and columns subtracted from said given degree.

13. The system of claim 9, wherein the orthogonal transform coefficient matrix for the encoded image data includes a number of rows and columns from a highest component side which consists entirely of 0 elements, and the image decoder means further interpolates values for picture elements for which a value of 0 is obtained by the inverse orthogonal transform due to said number of rows and columns.

14. The system of claim 13, wherein the image decoder means further distributes the picture elements for which non-zero values are obtained by the inverse orthogonal transform uniformly within each block before interpolating values for picture elements for which a value of 0 is obtained by the inverse orthogonal transform due to said number of rows and columns.

15. The system of claim 1, wherein the degrees of the transform matrices are greater than said given degree such that the encoded image data are expanded to the decoded image data.

16. The system of claim 15, wherein the image decoder means also changes the degree of the orthogonal transform coefficient matrix for the encoded image data from said given degree to the degrees of the transform matrices before applying the inverse orthogonal transform.

17. The system of claim 16, wherein the image decoder means sets all high components of the orthogonal transform coefficient matrix higher than said given degree equal to a prescribed value in changing the degree of the orthogonal transform coefficient matrix for the encoded image data.

18. The system of claim 17, wherein the prescribed value is equal to 0.

19. The system of claim 1, wherein the image decoder means decodes the encoded image data in units of blocks within the encoded image data.

20. A method of decoding encoded image data encoded by using an orthogonal transform of a given degree, comprising the steps of:
selecting transform matrices having degrees different from said given degree; and
applying inverse orthogonal transform to orthogonal transform coefficient matrix for the encoded image data by using the transform matrices selected at the selecting steps, to obtain decoded image data.

21. The method of claim 20, wherein said given degree is greater than the degrees of the transform matrices such that the encoded image data are contracted to the decoded image data.

22. The method of claim 21, further including the step of changing the degree of the orthogonal transform coefficient matrix for the encoded image data from said given degree to the degrees of the transform matrices before the applying step.

23. The method of claim 22, wherein at the changing step, lower components of the orthogonal transform coefficient matrix up to the degrees of the transform matrices are retained while high components of the orthogonal transform coefficient matrix higher than the degrees of the transform matrices are discarded.

24. The method of claim 21, wherein the orthogonal transform coefficient matrix for the encoded image data includes a number of rows and columns from a highest component side which consists entirely of 0 elements, and at the changing step the degree of the orthogonal transform coefficient matrix is changed from said given degree to degrees equal to said number of rows and columns subtracted from said given degree.

25. The method of claim 21, wherein the orthogonal transform coefficient matrix for the encoded image data includes a number of rows and columns from a highest component side which consists entirely of 0 elements, and which further comprises the step of interpolating values for picture elements for which a value of 0 is obtained at the applying step due to said number of rows and columns.

26. The method of claim 25, further comprising the step of distributing the picture elements for which non-zero values are obtained by the inverse orthogonal transform uniformly within each block before the interpolating step.

27. The method of claim 20, wherein the degrees of the transform matrices are greater than said given degree such that the encoded image data are expanded to the decoded image data.

28. The method of claim 27, further including the step of changing the degree of the orthogonal transform coefficient matrix for the encoded image data from said given degree to the degrees of the transform matrices before the applying step.

29. The method of claim 28, wherein at the changing step, all high components of the orthogonal transform coefficient matrix higher than said given degree are set equal to a prescribed value.

30. The method of claim 29, wherein the prescribed value is equal to 0.

31. The method of claim 20, wherein the encoded image data are decoded in units of blocks within the encoded image data.

* * * * *